United States Patent
Bartel et al.

(10) Patent No.: US 10,377,333 B2
(45) Date of Patent: Aug. 13, 2019

(54) DEPLOYABLE OPERATOR PROTECTION APPARATUS WITH AN OVER-CENTER LINKAGE

(71) Applicant: Excel Industries, Inc., Hesston, KS (US)

(72) Inventors: Harlan John Bartel, Newton, KS (US); Brian Lee Nebel, Hesston, KS (US); Royce A. Steinert, Hutchinson, KS (US)

(73) Assignee: EXCEL INDUSTRIES, INC., Hesston, KS (US)

( * ) Notice: Subject to any disclaimer, the term of this patent is extended or adjusted under 35 U.S.C. 154(b) by 237 days.

(21) Appl. No.: 15/415,630

(22) Filed: Jan. 25, 2017

(65) Prior Publication Data
US 2017/0129438 A1     May 11, 2017

Related U.S. Application Data

(63) Continuation-in-part of application No. 15/133,293, filed on Apr. 20, 2016, which is a continuation of application No. 14/540,708, filed on Nov. 13, 2014, now Pat. No. 9,327,670, which is a continuation of application No. 13/655,014, filed on Oct. 18, 2012, now Pat. No. 8,905,434, which is a continuation-in-part of application No. 12/945,277, filed on Nov. 12, 2010, now Pat. No. 8,528,924, application No. 15/415,630, which is a continuation-in-part of application No. 15/041,718, filed on Feb. 11, 2016, now Pat. No. 9,573,548.

(Continued)

(51) Int. Cl.
*B60R 21/13*     (2006.01)
*B60R 21/00*     (2006.01)

(52) U.S. Cl.
CPC .... *B60R 21/131* (2013.01); *B60R 2021/0018* (2013.01); *B60R 2021/0076* (2013.01); *B60Y 2200/223* (2013.01)

(58) Field of Classification Search
CPC .......... B60R 21/131; B60R 2021/0076; B60R 2021/134
USPC ....................................................... 280/756
See application file for complete search history.

(56) References Cited

U.S. PATENT DOCUMENTS

| | | | |
|---|---|---|---|
| 2,806,618 | A | 9/1957 | Cook |
| 3,584,897 | A | 6/1971 | George |

(Continued)

FOREIGN PATENT DOCUMENTS

| | | |
|---|---|---|
| EP | 0051100 A1 | 5/1982 |
| EP | 1197399 A2 | 4/2004 |

(Continued)

OTHER PUBLICATIONS

Non-Final Office Action dated Jun. 12, 2018 in U.S. Appl. No. 15/418,402, 11 pages.

(Continued)

*Primary Examiner* — Ruth Ilan
(74) *Attorney, Agent, or Firm* — Shook, Hardy & Bacon, LLP

(57) ABSTRACT

A operator protection apparatus unlocks and lowers from a raised position to a lowered position suitable for clearing a low hanging obstacle when an operator applies a force to an operator lever or pedal. The operator protection apparatus returns to the raised position when the operator ceases applying force to the operator lever or pedal.

20 Claims, 21 Drawing Sheets

Related U.S. Application Data

(60) Provisional application No. 61/281,059, filed on Nov. 12, 2009, provisional application No. 62/115,868, filed on Feb. 13, 2015.

(56) References Cited

U.S. PATENT DOCUMENTS

| | | | |
|---|---|---|---|
| 3,762,761 | A | 10/1973 | Erickson |
| 3,934,679 | A | 1/1976 | Lieptz |
| 4,202,565 | A | 5/1980 | Mosch |
| 4,666,183 | A | 5/1987 | Azzarello |
| 4,708,389 | A | 11/1987 | Maebayashi et al. |
| 4,715,468 | A | 12/1987 | Baumann et al. |
| 4,840,398 | A | 6/1989 | Matthias et al. |
| 4,877,265 | A | 10/1989 | DeBraal et al. |
| 4,949,991 | A | 8/1990 | Ludwig |
| 5,042,835 | A | 8/1991 | Burns |
| 5,129,676 | A | 7/1992 | Sheehan |
| 5,393,093 | A | 2/1995 | Wunsche et al. |
| 5,503,430 | A | 4/1996 | Miki |
| 5,779,272 | A | 7/1998 | Panek et al. |
| 5,839,758 | A | 11/1998 | Finch et al. |
| 6,322,130 | B1 | 11/2001 | Wanden |
| 6,902,024 | B2 | 6/2005 | Miiller et al. |
| 7,152,903 | B2 | 12/2006 | Westendorf et al. |
| 7,222,882 | B2 | 5/2007 | Boucher |
| 7,311,330 | B2 | 12/2007 | Kachouh |
| 7,396,047 | B1 | 7/2008 | Young |
| 7,434,379 | B2 | 10/2008 | Nogami et al. |
| 7,438,319 | B2 | 10/2008 | Cooper et al. |
| 7,565,732 | B2 | 7/2009 | Le et al. |
| 7,568,732 | B2 | 8/2009 | Schlup, Jr. |
| 7,922,201 | B2 | 4/2011 | Kurten et al. |
| 7,971,904 | B2 | 7/2011 | David |
| 7,971,905 | B2 | 7/2011 | McCord et al. |
| 8,016,320 | B2 | 9/2011 | Becker |
| 8,029,019 | B2 | 10/2011 | Schmidt et al. |
| 8,403,363 | B2 | 3/2013 | Duenchel et al. |
| 8,419,061 | B2 | 4/2013 | Fukunaga et al. |
| 8,424,911 | B2 | 4/2013 | Alexander, IV |
| 8,523,225 | B2 | 9/2013 | Reinke et al. |
| 8,528,924 | B1 | 9/2013 | Bartel et al. |
| 8,662,534 | B2 | 3/2014 | Beki et al. |
| 8,905,434 | B1 | 12/2014 | Bartel et al. |
| 9,327,670 | B1 | 5/2016 | Bartel et al. |
| 9,573,548 | B2 | 2/2017 | Bartel et al. |
| 9,616,837 | B1 | 4/2017 | Bartel et al. |
| 2003/0046794 | A1 | 3/2003 | Muir |
| 2005/0082808 | A1 | 4/2005 | Wildig et al. |
| 2005/0212278 | A1 | 9/2005 | Kurten |
| 2005/0217232 | A1 | 10/2005 | Asahara et al. |
| 2006/0001248 | A1 | 1/2006 | Queveau et al. |
| 2007/0094847 | A1 | 5/2007 | Thomson |
| 2007/0209160 | A1 | 9/2007 | Darscheid et al. |
| 2007/0290493 | A1 | 12/2007 | David |
| 2008/0034552 | A1 | 2/2008 | Nguyen |
| 2008/0136155 | A1 | 6/2008 | Janisch et al. |
| 2008/0217897 | A1 | 9/2008 | Latussek |
| 2008/0309058 | A1 | 12/2008 | Kurten et al. |
| 2017/0129438 | A1 | 5/2017 | Bartel et al. |
| 2018/0037183 | A1 | 2/2018 | Bartel et al. |

FOREIGN PATENT DOCUMENTS

| | | |
|---|---|---|
| EP | 1844990 A2 | 10/2007 |
| FR | 2541953 A1 | 9/1984 |
| GB | 2175259 A | 11/1986 |
| JP | H0640299 A | 2/1994 |
| JP | H06048259 A | 2/1994 |
| JP | H07323798 A | 12/1995 |

OTHER PUBLICATIONS

Non-Final Office Action dated Aug. 24, 2018 in U.S. Appl. No. 15/133,293, 8 pages.

International Preliminary Report on Patentability dated Aug. 24, 2017 in International Patent Application No. PCT/US2016/017782, 7 pages.

Ayers, P. et al., "Improving ROPS designs for agricultural tractors", University of Tennessee Department of Biosystems Engineering and Soil Science, International Conference RAGUSA SHAW 2012, Sep. 3-6, 2012, Ragusa, Italy, 7 pages.

International Search Report and Written Opinion dated Apr. 22, 2016 for PCT Patent Application No. PCT/US2016/017782, 8 pages.

University of Tennessee, Knoxville, Powered Foldable ROPS, Senior Project, Document created May 1, 2009, Publication Date Unknown.

Non-Final Office Action dated Jul. 29, 2015 in U.S. Appl. No. 14/540,708, 6 pages.

Non-Final Office Action dated Sep. 21, 2016 in U.S. Appl. No. 15/041,718, 8 pages.

DEPLOYABLE OPERATOR PROTECTION APPARATUS WITH AN OVER-CENTER LINKAGE

CROSS-REFERENCE TO RELATED APPLICATIONS

This application is a continuation-in-part of co-pending U.S. application Ser. No. 15/041,718 and co-pending U.S. application Ser. No. 15/133,293. U.S. application Ser. No. 15/041,718, filed Feb. 11, 2016, and entitled "Operator Protection Apparatus with an Over-Center Linkage," claims the benefit of U.S. Provisional Application No. 62/115,868, filed Feb. 13, 2015, and entitled "Rollover Protection Apparatus with an Over-Center Mechanism." U.S. application Ser. No. 15/133,293, filed Apr. 20, 2016, and entitled "Rollover Protection Apparatus," is a continuation of U.S. application Ser. No. 14/540,708 (now U.S. Pat. No. 9,327,670), filed Nov. 13, 2014, and entitled "Rollover Protection Apparatus." U.S. application Ser. No. 14/540,708 is a continuation of U.S. application Ser. No. 13/655,014 (now U.S. Pat. No. 8,905,434), filed on Oct. 18, 2012, and entitled "Rollover Protection Apparatus." U.S. application Ser. No. 13/655,014 is a Continuation-in-Part of U.S. application Ser. No. 12/945,277 (now U.S. Pat. No. 8,528,924), filed on Nov. 12, 2010, and entitled "Rollover Protection System." U.S. application Ser. No. 12/945,277 claims the benefit of U.S. Provisional Application No. 61/281,059, filed on Nov. 12, 2009, and entitled "Rollover Protection System." The entirety of each of the aforementioned applications is hereby incorporated by reference herein.

FIELD

Aspects provided herein relate to an operator protection apparatus for vehicles. More particularly, aspects herein relate to an operator protection apparatus that is movable between a raised position and a lowered position and that includes an over-center linkage for securing the apparatus in the raised position.

BACKGROUND

Some operator or operator protection apparatuses for terrain-working vehicles may have a fold-down capability for avoiding overhead obstacles. Traditionally, foldable operator protection apparatuses have included a lower portion in a fixed position and an upper portion that is mounted to the lower portion. Further, many foldable operator protection apparatuses require that an operator manually actuate the upper portion between a raised and a lowered position, which may require that the operator leave the seating platform of the vehicle. Resultantly, efficiencies in the operation performed by the operator may be reduced.

Additionally, previous foldable operator protection apparatuses have used bulky securing devices to secure the upper portion in a raised position. Various securing devices, such as removable pins and the like, have been employed to secure upper portions in a raised position. Further, as can be appreciated, removable securing devices may be lost or misplaced, further decreasing efficiencies of the operator during operations.

SUMMARY

In accordance with aspects herein, an operator protection apparatus is provided that is biased toward a raised and locked position, such that the operator protection apparatus automatically returns to the raised and locked position. The operator protection apparatus comprises a lower portion and an upper portion movably coupled to the lower portion such that the upper portion is movable relative to the lower portion between a raised position and a lowered position, and an over-center linkage movable between a locked position and an unlocked position, the locked position securing the upper portion in the raised position. Additionally, in accordance with aspects herein, upon an application of a force to an input device controllingly coupled with the operator protection apparatus, the over-center linkage moves to the unlocked position and upon a cessation of the force, the over-center linkage moves to the locked position.

In another aspect herein, a terrain-working vehicle with an operator protection apparatus comprises a frame, an operator platform coupled to the frame, and an operator protection apparatus. The operator protection apparatus comprises a lower portion and an upper portion movably coupled to the lower portion such that the upper portion is movable relative to the lower portion between a raised position and a lowered position, an over-center linkage coupled to the lower portion and the upper portion, and an actuator coupled to the over-center linkage. In accordance with aspects herein, upon an application of a force to an input device, the actuator is operable to move the over-center linkage an unlocked position. Further, upon cessation of the force to the input device, actuator is operable to move the over-center linkage toward a locked position, the locked position securing the upper portion in the raised position.

In yet another aspect herein, a method of operating a foldable operator protection apparatus is provided. The method comprises applying a first force to an over-center linkage coupled to the operator protection apparatus, the operator protection apparatus having a lower portion, an upper portion, and the over-center linkage, moving the upper portion of the operator protection apparatus toward a lowered position; and upon determining that the continuous application of the force has ceased, moving the upper portion toward a raised position.

DETAILED DESCRIPTION

Figure 1:
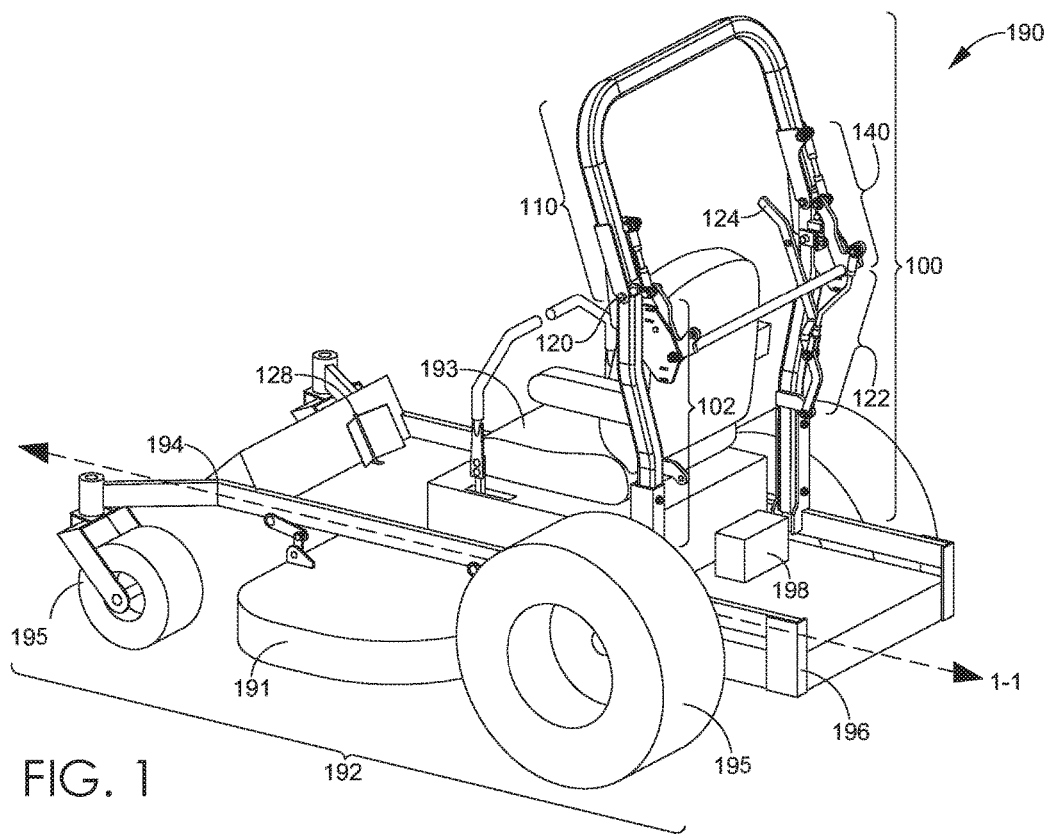
FIG. 1 depicts a riding mower having an operator protection apparatus affixed thereto in a raised position, in accordance with aspects hereof.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies.

Aspects hereof relate to an operator protection apparatus that can be raised and lowered by an operator in a seated position, for example, on a riding mower. Additionally, the operator protection apparatus may lock in the raised position. The movement and locking may be facilitated by an over-center linkage. For example, when an operator raises an upper portion of the operator protection apparatus, a center pivot joint of the over-center linkage may be configured to move to a position past a centerline defined as extending between pivots points at opposing ends of the linkage. Accordingly, a mechanical force is then required to overcome the lock and allow the operator protection apparatus to return to a lowered position.

As a result, an operator may lower the upper portion of the operator protection apparatus, for example to avoid an obstacle, without stopping operation or leaving an operator seat of the vehicle. As can be appreciated, the convenience and ease of use of the operator protection apparatuses described herein may be conducive to improving the frequency of use of the operator protection apparatus. Further, the over-center linkage may provide a securing device that remains attached to the operator protection apparatus. Accordingly, the operator protection apparatuses provided herein may be secured in the raised and/or locked position using a securing device without loose parts. As a result, the apparatuses provided herein may eliminate the need for removable securing mechanisms, which if detached and misplaced, may cause inefficiencies during the operation of a vehicle associated with the operator protection apparatus.

A first exemplary embodiment provides for an operator protection apparatus, the apparatus comprising a lower portion and an upper portion. The lower portion may have a first end and a second end and the upper portion may also have a first end and a second end. The apparatus may also include at least one hinge joint (e.g., pivot) coupling the lower portion second end to the upper portion first end such that the upper portion is movable relative to the lower portion. Stated differently, the upper portion may be pivotably coupled with the lower portion. Further, in some aspects, the apparatus comprises at least one over-center linkage effective to lock the upper portion in a set position (e.g., raised) relative to the lower portion. The over-center linkage comprises a lower link assembly having a first end and a second end, the first end is pivotably coupled to the lower portion at a lower pivot joint. The over-center linkage further comprises an upper link assembly having a first end and a second end, the upper link assembly first end is pivotably coupled to the lower link assembly second end forming a center pivot joint, and the upper link assembly second end is pivotably coupled with the upper portion at an upper pivot joint. Accordingly, the over-center linkage is in a locked position when the center pivot joint is on a first side of a line extending between the lower pivot joint and the upper pivot joint and the center pivot joint is in an unlocked position on a second side of the line. The apparatus may also include at least one actuator coupled to the over-center linkage.

A second exemplary embodiment provides for an operator protection apparatus for a terrain-working vehicle. The operator protection apparatus may comprise a lower portion having a first end and a second end, wherein the first end is affixed to a frame of the terrain-working vehicle; an upper portion having a first end and a second end; and at least one hinge joint coupling the lower portion second end to the upper portion first end such that the upper portion is movable relative to the lower portion. The operator protection apparatus may include at least one over-center linkage, the at least one over-center linkage comprising: a lower link assembly having a first end and a second end, the first end pivotably coupled to the lower portion at a lower pivot joint; an upper link assembly having a first end and a second end, the upper link assembly first end pivotably coupled to the lower link assembly second end forming a center pivot joint, and the upper link assembly second end pivotably coupled with the upper portion at an upper pivot joint. In one aspect, the over-center linkage is in a locked position when the center pivot joint is on a first side of a line extending between the lower pivot joint and the upper pivot joint and the center pivot joint is in an unlocked position on a second side of the line. The operator protection apparatus may also include at least one actuator coupled to the over-center linkage.

Yet another exemplary embodiment provides for a riding mower having an operator protection apparatus. The riding mower may comprise a frame; a mower deck coupled to the frame; and an operator protection apparatus. The apparatus may comprise: a lower portion comprising a first lower portion upright having a first upright first end and a first upright second end, and a second lower portion upright having a second upright first end and a second upright second end. The apparatus may additionally comprise an upper portion comprising a first upper portion member having a first member first end and a first member second end, a second upper portion member having a second member first end and a second member second end, and a transverse member disposed between the first member second end and the second member second end. The apparatus may also include a pair of hinge joints coupling the first upright second end to the first member first end and the second upright second end to the second member first end such that the upper portion is movable relative to the lower portion. Further, the apparatus comprises a first over-center linkage, the first over-center linkage comprising: a first lower link assembly having a first lower link first end and a first lower link second end, wherein the first lower link first end is pivotably coupled to the first lower portion upright at a first lower link pivot joint; a first upper link assembly having a first upper link first end and a first upper link second end, wherein the first upper link assembly first end is pivotably coupled to the first lower link assembly second end at a first center pivot joint. In one aspect, the first over-center linkage is in a locked position when the first center pivot joint is on a first side of a first line extending between the first lower link pivot joint and the first upper link pivot joint, and the first over-center linkage is in an unlocked position when the first center pivot joint is on a second side of the first line. The operator protection apparatus may also include a first actuator coupled to the first over-center linkage at a first actuator-over-center pivot joint and coupled to the first lower portion upright at a first actuator-upright pivot joint for moving the upper portion between the locked position and the unlocked position. The riding mower may also include a controller for controlling one or more operations of the riding mower; and one or more sensors communicatively coupled to the controller.

FIG. 1 depicts an exemplary aspect of an operator protection apparatus 100 mounted on a riding mower 190, in accordance with aspects hereof. In some aspects, the riding mower may include a mower deck 191 coupled to a frame 192, and a controller 198. The frame 192 has a frame first end 194 and a frame second end 196. In one aspect herein, a horizontal line 1-1 extending from the frame first end 194 to the frame second end 196 defines a horizontal plane, which may be referred to herein in order to describe locations and positions of various components of the operator protection apparatuses described herein. The mower 190 of FIG. 1 is exemplary in nature. It is contemplated that the operator protection apparatuses provided herein may be associated with any vehicle having an occupant. Nonlimiting examples of vehicles with which the operator protection apparatus may be associated include terrain-working vehicles, lawn tractors, UTVs, ATVs, compact tractors, and loaders.

The operator protection apparatus 100 may include a lower portion 102 and an upper portion 110. In some aspects, the lower portion 102 may comprise a pair of mirror-image lower portion uprights 101. Accordingly, the lower portion 102 may be described herein as comprising the pair of lower portion uprights 101. The lower portion 102 may be affixed to or integrally formed with a frame of any number of vehicles. Similarly, the upper portion 110 may include a pair of mirror-image upper portion members and a transverse member affixed between the upper portion members. Accordingly, the upper portion 110 may be described herein as comprising the upper portion members and the transverse member. However, as will be provided hereinafter, alternative configurations are contemplated while achieving the aspects provided for the operator protection apparatus 100.

Further, the operator protection apparatus 100 may comprise at least one hinge joint 120 for coupling the lower portion 102 to the upper portion 110 and at least one over-center linkage 140. The over-center linkage 140 may be pivotably coupled to the lower portion 102 and the upper portion 110. Further, the over-center linkage 140 may be movable between a locked and an unlocked position. In one example, when in the locked position, the over-center linkage 140 may provide a mechanical stop to prevent backdriving of the operator protection apparatus 100, in order to keep the operator protection apparatus 100 in a raised position.

Figure 2:
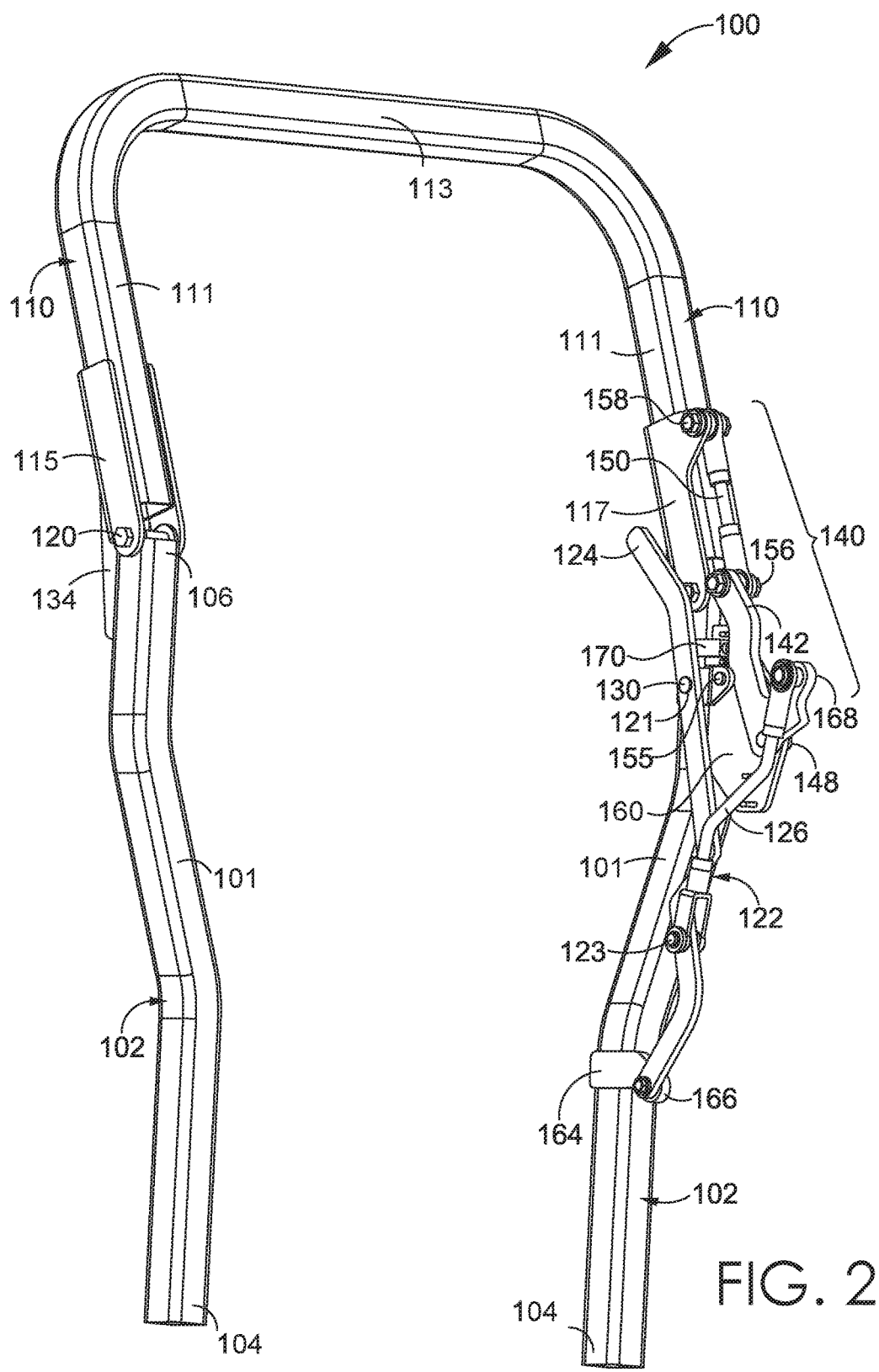
FIG. 2 depicts a perspective view of an operator protection apparatus having an over-center linkage in a raised position, in accordance with aspects hereof.

FIG. 2 depicts a perspective view of one embodiment of the operator protection apparatus 100 having at least one over-center linkage 140, in accordance with aspects hereof. The operator protection apparatus 100 may include a lower portion 102 and an upper portion 110. Additionally, the operator protection apparatus 100 may include at least one over-center linkage 140. In some aspects, the over-center linkage 140 may include a lower link assembly 142 pivotably coupled to the lower portion 102 at a lower pivot joint 148. The lower link assembly 142 may be coupled to the lower portion 102, in one aspect, via a lower portion bracket 160, or may be directly coupled thereto. Further, the over-center linkage 140 may include an upper link assembly 150 pivotably coupled to the lower link assembly 142 at a center pivot joint 156. Additionally, the upper link assembly 150 may be pivotably coupled with the upper portion 110 at an upper pivot joint 158. Any of the links, members, or other elements may be adjustable in orientation and/or length to achieve aspects provided herein. For example, the upper link assembly 150 may be an opposing threaded screw link allowing for a rotational movement to adjust the length of the link.

Further, the operator protection apparatus 100 may include a stop lug 155 for limiting movement of the over-center linkage 140 beyond the locked position. In one aspect, the stop lug 155 may be affixed to the lower portion 102 (for example via a bracket) such that the lower link assembly 142 contacts the stop lug 155 when the over-center linkage 140 is in the locked position. In other aspects, the stop lug 155 may be affixed to the upper portion 110. The stop lug 155 is one example of a mechanism for limiting movement of the over-center linkage 140 beyond the locked position. Other structures and mechanisms for limiting movement of the over-center linkage 140 may also be employed. In an additional aspect, the stop lug 155, or other stopping mechanism, may be associated with the over-center linkage 140. For example, the stop lug 155 may be affixed to the over-center linkage 140 such that the stop lug 155 contacts the surface of the lower portion 102 and/or the upper portion 110. Additionally, one or more pivot joints associated with the over-center linkage 140 (for example, lower pivot joint 148, upper pivot joint 158, and center pivot joint 156) may be limited pivot joints, such that the joints include a limiter for limiting rotation past the locked position.

Additionally, the operator protection apparatus 100 may include at least one actuator 122 coupled to the over-center linkage 140. The actuator 122 may generally operate to articulate the over-center linkage 140 between the locked position and the unlocked position. In some aspects, once the actuator 122 has moved the over-center linkage 140 to the unlocked position, the actuator 122 may provide a force required to move the upper portion 110 to the lowered position and return the upper portion 110 to the a raised and/or locked position. Although shown as a hand lever 124, the actuator 122 may be a powered actuator, such as an electric, pneumatic, hydraulic, or mechanical actuator. Several examples of actuators are described below, however any suitable mechanism for performing the actuation is considered within the scope of this disclosure.

Additionally, the apparatus may comprise at least one securing device 130 associated with the over-center linkage 140 and permanently affixed to the apparatus. In one aspect, the securing device 130 may include a projection, such as a pen or a boss, for engaging a securing device engagement aperture 121 of the hand lever 124. In one example, the projection may be spring-loaded, such that when the projection is aligned with the securing device engagement aperture 121, the hand lever 124 is secured. Further, the securing device 130 may include a sensor for detecting an engagement of the securing device 130. In some aspects, the sensor may be integrated with the securing device 130, or may be associated with the securing device 130. Any number of securing devices may be suitable for securing the actuator 122. At a high level, the securing device 130 retains the actuator 122, such that the actuator 122 ensures the over-center linkage 140 remains in the locked position.

In one aspect, the operator protection apparatus 100 includes a position sensor 170. The position sensor 170 may be configured to detect one or more positions of the operator protection apparatus 100. For example, the sensor may be configured to detect when the operator protection apparatus 100 is in a locked position. In additional aspects, the position sensor 170 may be detect when the operator protection apparatus 100 is in the raised position, but is not in the locked position. In one aspect, the position sensor 170 may detect the locked position when the over-center linkage 140 comes in contact with and depresses a button that is coupled with the position sensor 170. For example, the position sensor 170 may be mounted on the operator protection apparatus 100 such that the button is only depressed when the over-center linkage 140 is in the locked position. Accordingly, the position sensor 170 may detect that the over-center linkage 140 is in the unlocked position when the button is not depressed. Further, in some aspects of the position sensor 170 may be configured to communicate the one or more positions, for example to a controller 198 (described in more detail below). Accordingly, a time that the operator protection apparatus 100 is in each position of the one or more positions may be determined using the sensed information detected by the position sensor 170.

Figure 3:
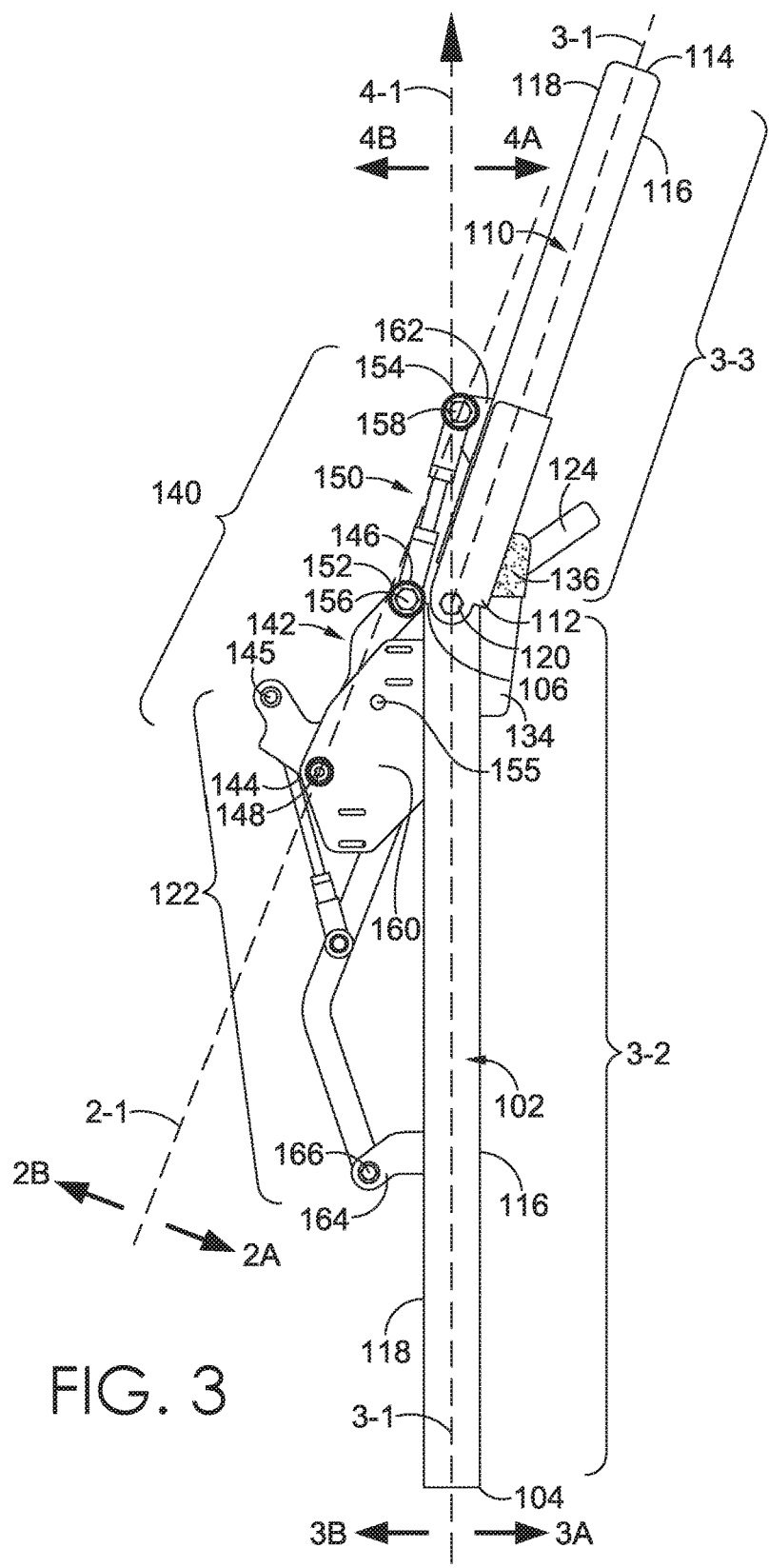
FIG. 3 depicts a side view of the operator protection apparatus of FIG. 2 in the raised position, in accordance with aspects hereof.

As shown in FIG. 3, the lower portion 102 may comprise a lower portion first end 104 and a lower portion second end 106. The lower portion first end 104 may be welded to (or fastened using any number of means), or may be integrally formed with a frame of a vehicle. Accordingly, the term "end," as used herein, does not necessarily indicate a point at which a given component terminates. For example, the lower portion first end 104 may be contiguous with the frame of the vehicle. The upper portion 110 may include an upper portion first end 112 and an upper portion second end 114. The operator protection apparatus 100 may also include at least one hinge joint 120, as described above. In one aspect, the at least one hinge joint 120 may couple the lower portion second end 106 to the upper portion first end 112, such that the upper portion 110 is movable relative to the lower portion 102.

The over-center linkage 140 may include the lower link assembly 142 having a lower link first end 144 and a lower link second end 146. The lower link first end 144 may be pivotably coupled to the lower portion 102 at the lower pivot joint 148. Further, the over-center linkage 140 may include an upper link assembly 150 having an upper link first end 152 and an upper link second end 154. The upper link first end 152 may be pivotably coupled to the lower link second end 146 to form a center pivot joint 156. Additionally, the upper link assembly second end 146 may be pivotably coupled with the upper portion 110 at an upper pivot joint 158.

Figure 5:
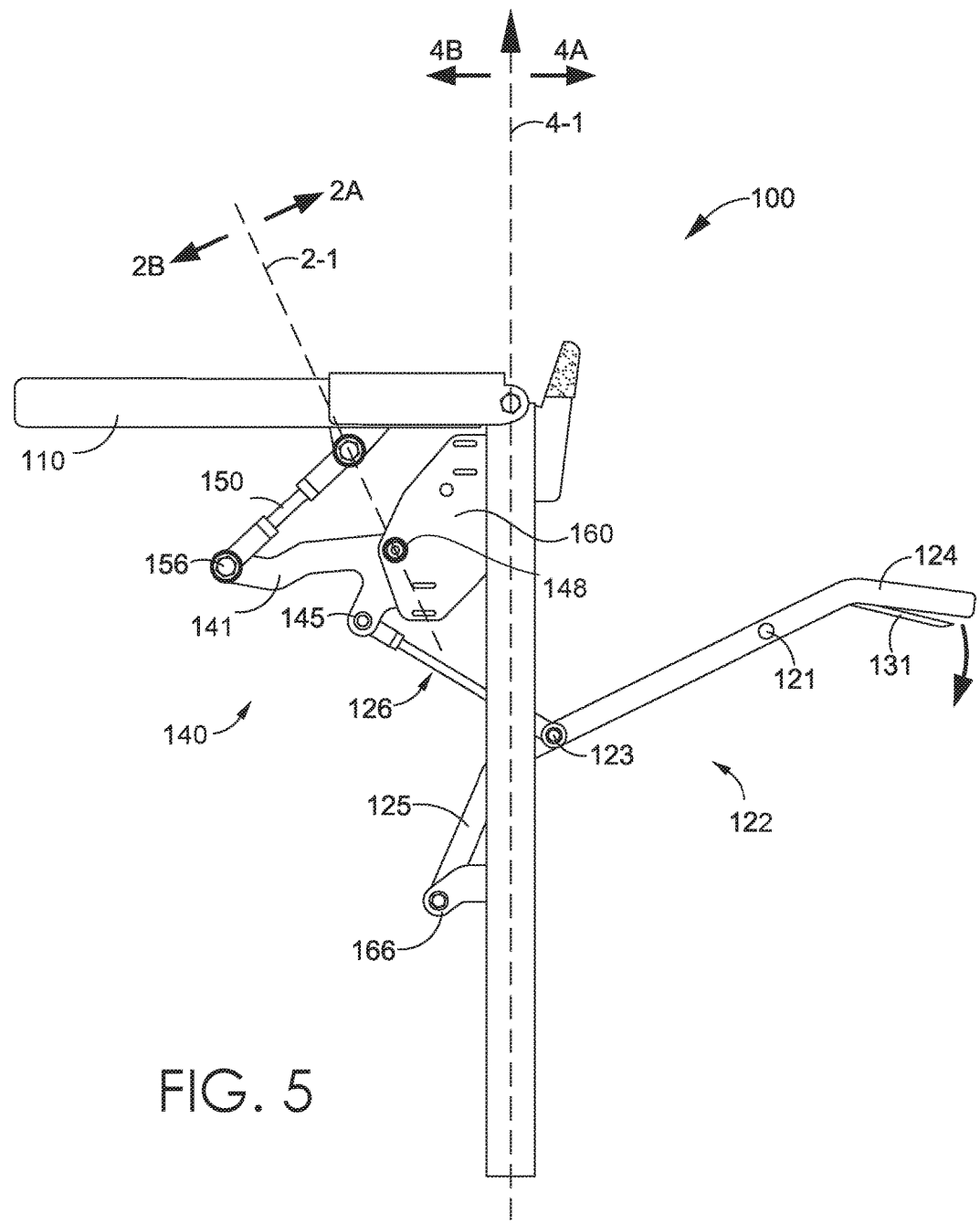
FIG. 5 depicts a perspective view of the operator protection apparatus of FIG. 2 in a lowered position, in accordance with aspects hereof.

Turning now to more particular aspects, the over-center linkage 140 may include a centerline 2-1, as seen in FIG. 3, extending between the lower pivot joint 148 and the upper pivot joint 158. The centerline 2-1 may include a first side 2A and a second side 2B. The over-center linkage 140 may be in a locked position when the center pivot joint 156 is on the first side 2A of centerline 2-1. Accordingly, the over-center linkage 140 may be in an unlocked position (as shown in FIG. 5) when the center pivot joint 156 is on the second side 2B of the centerline 2-1. As can be appreciated, in alternative configurations the over-center linkage 140 may be oriented and positioned such that the over-center linkage 140 is configured to be in the locked position in a variety of directions. Such alternative configurations are considered within the scope of this disclosure.

Further, when the over-center linkage 140 is in the locked position, the over-center linkage 140 may provide a mechanical stop to prevent back-driving of the mechanism. In some aspects, the movement of the center pivot joint 156 in the direction of the first side 2A may be limited, for example, such by the stop lug 155. In other aspects, the center pivot joint 156 may be limited by the lower portion 102 and the upper portion 110, or by a center pivot joint 156 that limits rotation in the direction of the first side 2A.

With continued reference to FIG. 3, the operator protection apparatus 100 may be described as having a midline 3-1. The midline 3-1 of the operator protection apparatus 100 may have a first midline line segment 3-2 extending from the lower portion first end 104 to the hinge joint 120 and a second midline line segment 3-3 extending from the hinge joint 120 to the upper portion second end 114. Accordingly, the midline 3-1 may define a midline first side 3A and a midline second side 3B. Further, a lower portion ray 4-1 may extend from the lower portion first end 104 through the hinge joint 120. Said another way, the lower portion ray 4-1 may be an extension of first midline line segment 3-2. Further, the lower portion ray 4-1 may have a lower portion ray first side 4A and a lower portion ray second side 4B. Accordingly, the operator protection apparatus 100 may be described as having first side 116 and a second side 118 opposite the first side 116. The first side 116 of the operator protection apparatus 100 may be oriented in the same direction as midline first side 3A, and the second side 118 may be oriented in the same direction as midline second side 3B.

In some aspects, the operator protection apparatus 100 may include a stop 134 associated with at least one of the upper portion 110 and the lower portion 102. The stop 134 limits a range of motion of the upper portion 110 in a radial direction toward the lower portion ray first side 4A. The stop 134 may be affixed to the operator protection apparatus 100 first side 116 proximate the lower portion second end 106, and extend, at least in part, beyond the upper portion first end 112. Accordingly, when the operator protection apparatus 100 is in a locked position, the upper portion may contact the stop 134. In some aspects, the stop 134 may include a bumper 136. The bumper 136 may be any suitable material for dampening contact forces with the stop 134, such as a polymer based material. Further, because the range of motion of the upper portion 110 is limited, a range of motion of the center pivot joint 156 of the over-center linkage 140 may also be limited, for example, by coming in contact with the lower portion 102 and/or the upper portion 110. Additionally, as discussed hereinabove, the stop lug 155, or other mechanism, may limit movement of the over-center linkage 140 beyond the locked position.

In some aspects, the lower link assembly 142 may be coupled to the lower portion 102 by a lower portion bracket 160 and the upper link assembly 150 may be coupled to the upper portion 110 by an upper portion bracket 162. The lower portion bracket 160 and upper portion bracket 162 may be welded (or fastened using any number of means), or may be integrally formed with the upper portion 110 and the lower portion 102. In some aspects, the lower portion bracket 160 and upper portion bracket 162 may each be offset from the lower portion 102 and the upper portion 110. For example, each of the lower portion bracket 160 and the upper portion bracket 162 may extend outwardly from the second side 118 of the operator protection apparatus 100. In some aspects, the lower portion bracket 160 may extend further outward from the second side 118 than the upper portion bracket 162. As a result, the lower pivot joint 148 may be positioned on the lower portion ray second side 4B and the upper pivot joint 158 may be positioned (at least in part) on the lower portion ray first side 4A. Accordingly, the over-center linkage 140 may provide a mechanical advantage for retaining the operator protection apparatus 100 in a locked position, in that the center pivot joint 156 is biased toward the lower portion ray 4-1 when the operator protection apparatus 100 is in a raised and/or locked position.

Figure 4:
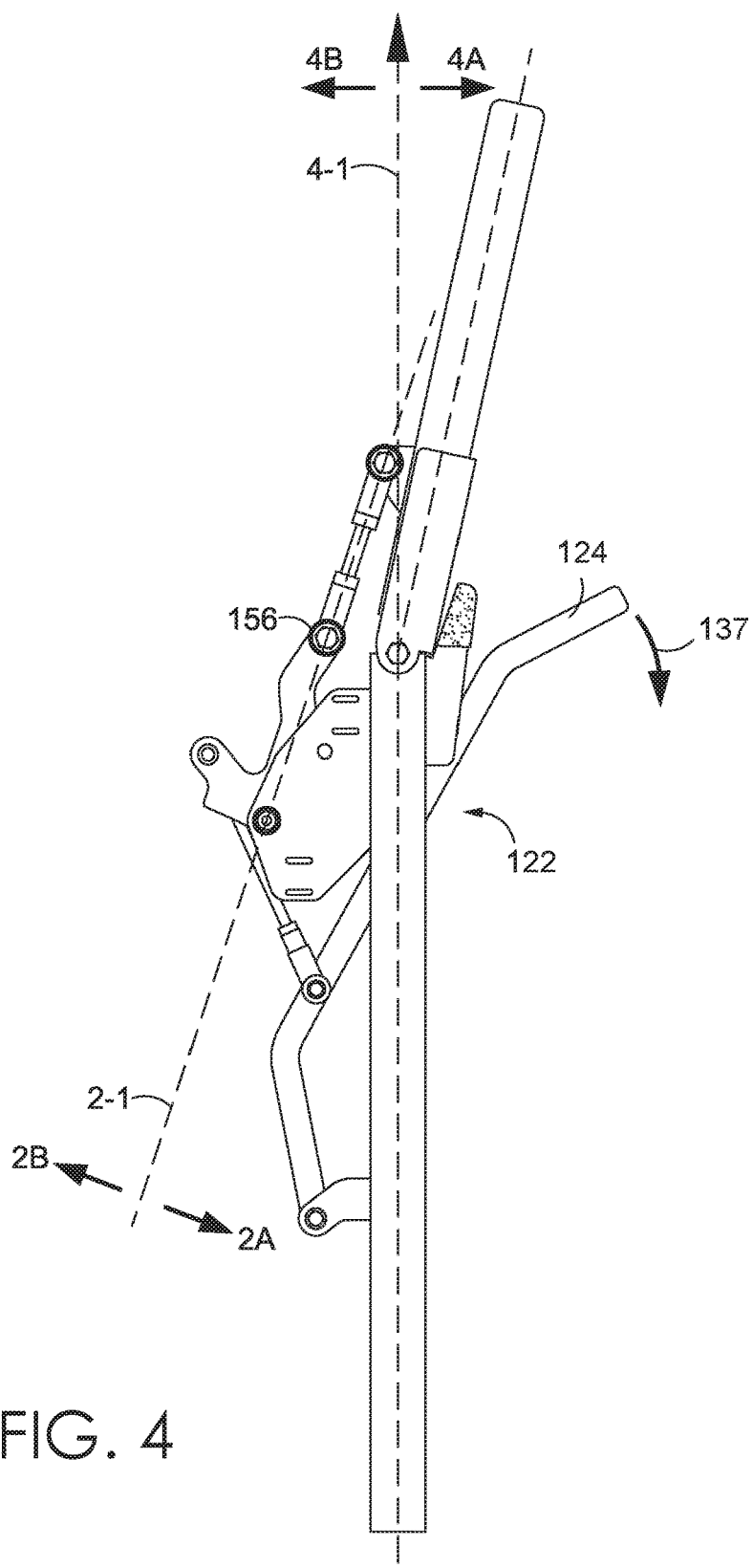
FIG. 4 depicts a side view of the operator protection apparatus of FIG. 2 in a top dead center position, in accordance with aspects hereof.

Turning now to FIG. 4, the over-center linkage 140 is shown in a top dead center position, in accordance with aspects hereof. The center pivot joint 156 may be positioned directly along centerline 2-1 when in the top dead center position. Said another way, the center pivot joint 156 is neither on the first side 2A, nor on the second side 2B of the centerline 2-1 when in the top dead center position. Accordingly, FIG. 4 depicts a break over point, or a point at which the over-center linkage 140 is no longer in the locked position. In one example, the over-center linkage may be moved to this position by the actuator 122, which supplies the force required to overcome the lock provided by the over-center linkage 140.

FIG. 5 depicts the operator protection apparatus 100 in a lowered position. As shown, the over-center linkage 140 is in the unlocked position, in that the center pivot joint 156 is on the second side 2B of the centerline 2-1. Additionally, the upper portion 110 is positioned on the lower portion ray second side 4B of lower portion ray 4-1. As described above, in one aspect, the actuator 122 comprises the hand lever 124. The hand lever 124 may include a hand lever pivot joint 123 coupled to a hand-lever actuator linkage 126 that extends from the hand lever 124 to an actuator-over-center pivot joint 145. Accordingly, a hand lever lower portion 125 may extend from an actuator-lower portion pivot joint 166 to the hand lever pivot joint 123. In some aspects, the hand lever 124 includes a trigger 131 that is configured to disengage the securing device 130, for example via a cable or other linking mechanism, thereby allowing the operator protection apparatus 100 to be lowered.

Figure 6:
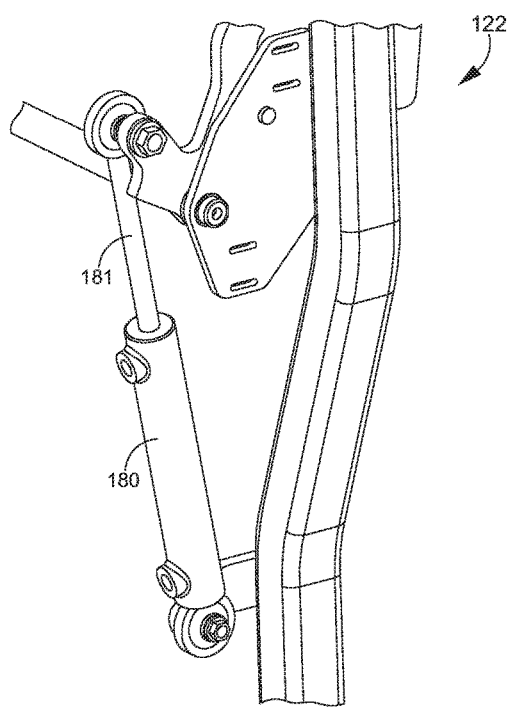
FIG. 6 depicts a perspective view of an exemplary powered actuator, in accordance with aspects hereof.
Figure 7:
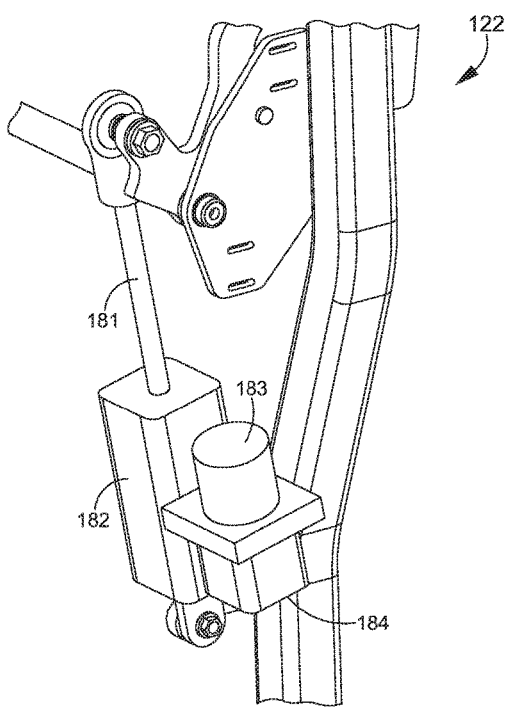
FIG. 7 depicts a perspective view of an exemplary electric-hydraulic actuator, in accordance with aspects hereof.

As mentioned above, any number of suitable actuators may be employed in place of or in conjunction with the hand lever 124. For example, as depicted in FIG. 6, the actuator 122 may comprise a powered actuator, such as a hydraulic actuator 180. The operator protection apparatus 100 may be associated with a vehicle equipped with a hydraulic system. In one aspect, the hydraulic actuator may be powered by the hydraulic system of the vehicle. Additionally, as shown in FIG. 7, the actuator 122 may be an electric-hydraulic actuator 182. For example, the electric-hydraulic actuator may include an electric motor 183 that turns a pump 184. The electric-hydraulic actuator 182 may include a switch that turns the motor 183 on and off and controls the direction of the motor 183. The direction in which the motor 183 turns may determine whether a cylinder 181 of the actuator is extended for retracted. For example, when the motor 183 turns in a first direction, the pump 184 pumps fluid such that the cylinder 181 is extended. Accordingly, when the motor 183 turns in a second direction, opposite of the first direction, the fluid is pumped in an opposite direction such that the cylinder 181 is retracted.

Figure 8:
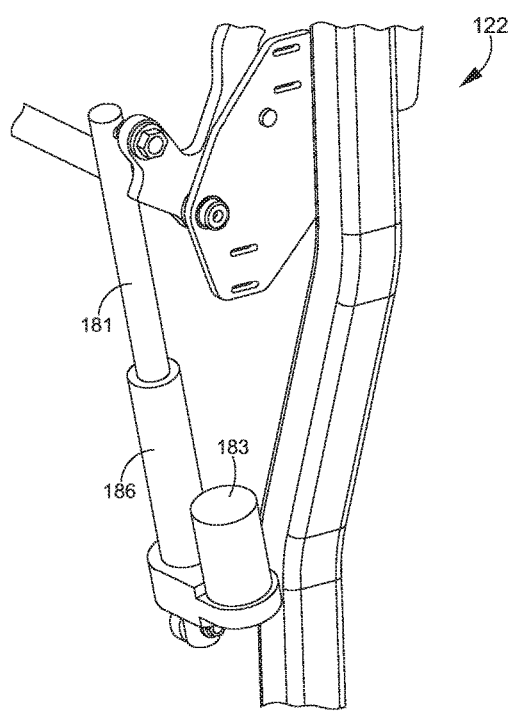
FIG. 8 depicts a perspective view of an exemplary electric actuator, in accordance with aspects hereof.
Figure 9:
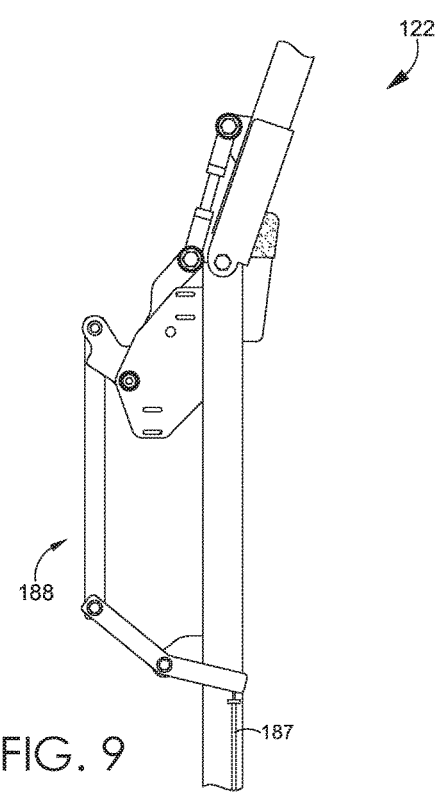
FIG. 9 depicts a perspective view of an mechanical actuator, in accordance with aspects hereof.

Further, as shown in FIG. 8, an electric-linear actuator 186 may be implemented. The electric-linear actuator 186 may include a motor 183 that turns a gear reduction set, which turns a screw thread. Accordingly, the cylinder 181 extends and retracts based on which direction the motor 183 turns. In an additional aspect, as shown in FIG. 9, the actuator may include a mechanical linkage 188. In one example, the mechanical linkage 188 may be connected to a foot pedal 128 (shown in FIG. 1) by a cable 187. The foot pedal 128 may have a first side and a second side that rotate about a pivot such that both sides of the foot pedal 128 may be depressed by an operator. In one aspect, when the first side of the pedal 128 is pushed the cable 187 may be extended, thereby urging the mechanical linkage 188 in a direction that disengages the over-center linkage 140. Accordingly, when the second side of the foot pedal 128 is depressed, the cable 187 may be retracted, thereby causing the mechanical linkage 188 to pull the over-center linkage 140 toward the raised position.

Figure 10:
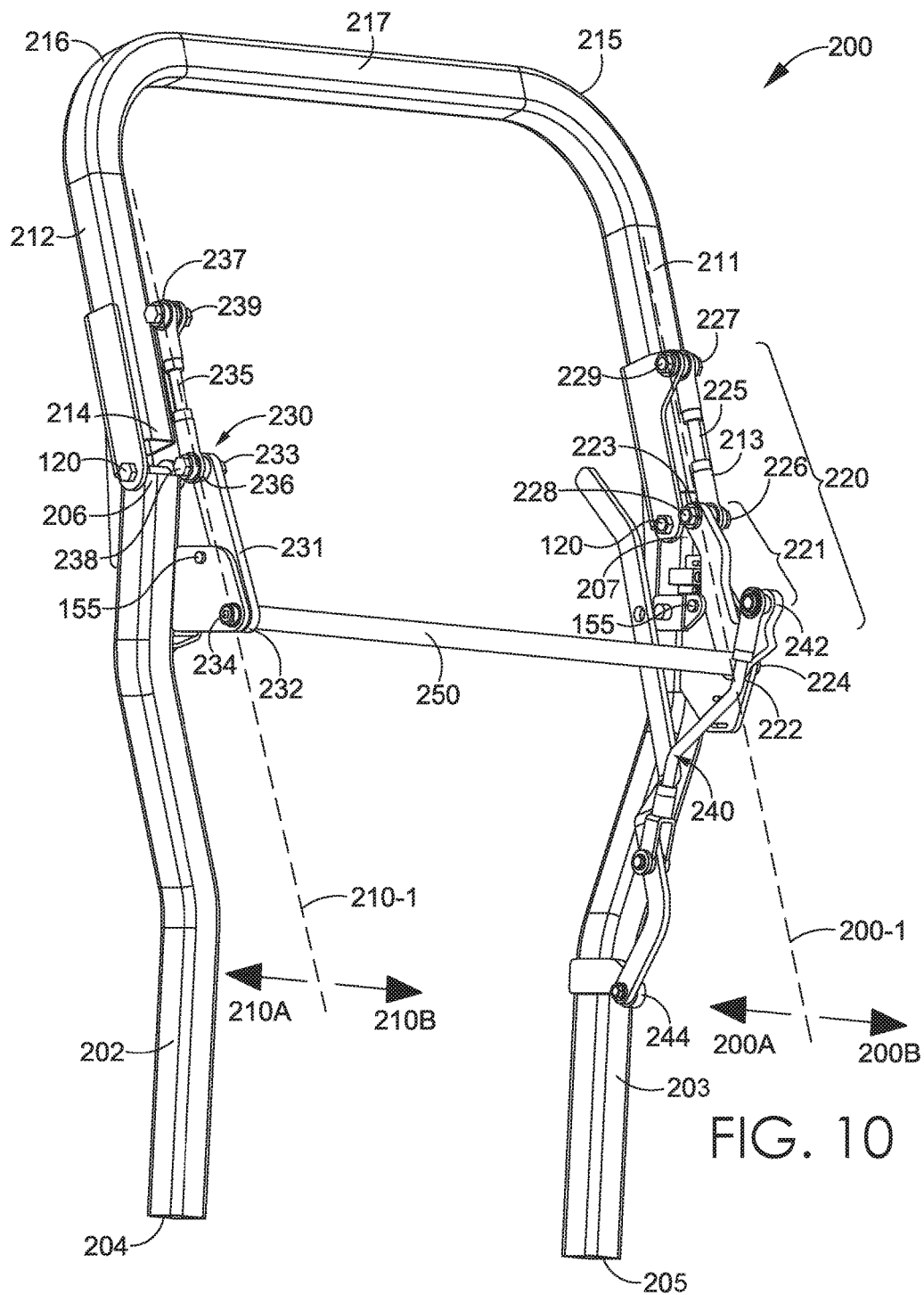
FIG. 10 depicts a perspective view of an operator protection apparatus having two over-center linkages in a raised position, in accordance with aspects hereof.

Turning now to FIG. 10, in another exemplary embodiment, an operator protection apparatus 200 having two over-center linkages is depicted. The operator protection apparatus 200 may include a lower portion 201 comprising a first lower portion upright 202 and a second lower portion upright 203. The first lower portion upright 202 may have a first upright first end 205 and a first upright second end 207. The second lower portion upright 203 may have a second upright first end 204 and a second upright second end 206. In one aspect, the first upright first end 205 and the second upright first end 204 may be affixed to a frame of a terrain-working vehicle, for example, a riding mower.

Additionally, an upper portion 210 may comprise a first upper portion member 211 and a second upper portion member 212. The first upper portion member 211 may have a first member first end 213 and a first member second end 215. The second upper portion member 212 may have a second member first end 214 and a second member second end 216. Further, the upper portion 210 may comprise a transverse member 217 disposed between the first member second end 215 and the second member second end 216.

While the first upper portion member 211 and the second upper portion member 212 are discussed as distinct members, it is contemplated that they form a continuous and contiguous assembly as a common component or assembly. Further, the operator protection apparatus may have a pair of hinge joints 120 coupling the first upright second end 207 to the first member first end 213 and the second upright second end 206 to the second member first end 214, such that the upper portion 210 is movable relative to the lower portion 201.

Additionally, in some aspects, the operator protection apparatus 200 may include a first over-center linkage 220. The first over-center linkage 220 may comprise a first lower link assembly 221 having a first lower link first end 222 and a first lower link second end 223. The first lower link first end 222 may be pivotably coupled to the first lower portion upright 202 at a first lower link pivot joint 224. The first over-center linkage 220 may also comprise a first upper link assembly 225 having a first upper link first end 226 and a first upper link second end 227. The first upper link assembly 225 first end may be pivotably coupled to the first lower link second end 223 at a first center pivot joint 228. Further, the first upper link second end 227 may be pivotably coupled to the first upper portion member 211 at a first upper pivot joint 229.

Further, in some aspects, the operator protection apparatus 200 comprises a second over-center linkage 230. The second over-center linkage 230 may comprise a second lower link assembly 231 having a second lower link first end 232 and a second lower link second end 233. The second lower link first end 232 may be pivotably coupled to the second lower portion upright 203 at a second lower link pivot joint 234. The second over-center linkage 230 may also comprise a second upper link assembly 235 having a second upper link first end 236 and a second upper link second end 237. The second upper link assembly 235 first end may be pivotably coupled to the second lower link second end 233 at a second center pivot joint 238. Further, the second upper link second end 237 may be pivotably coupled with the second upper portion member 212 at a second upper pivot joint 239.

Similar to the over-center linkage 140 described hereinabove, the first over-center linkage 220 may be in a locked position when the first center pivot joint 228 is on a first centerline first side 200A of a first centerline 200-1 extending between the first lower link pivot joint 224 and the first upper link pivot joint 229. Accordingly, the second over-center linkage 230 may be in a locked position when the second center pivot joint 238 is on a second centerline first side 210A of a second centerline 210-1 extending between the second lower link pivot joint 234 and the second upper pivot joint 239.

In one aspect, the operator protection apparatus 200 comprises a first actuator 240 for moving the first over-center linkage 220 between the locked position and an unlocked position. The first actuator 240 may be coupled to the first over-center linkage 220 at a first actuator-over-center pivot joint 242 and coupled to the lower portion 201 of the upright at a first actuator-upright pivot joint 244. In some aspects, the apparatus includes a torque tube 250 (which may be referred to as a rod) affixed between the over-center linkages 220 and 230. The torque tube 250 may transfer the rotational force supplied by the actuator 240 from the first over-center linkage 220 to the second over-center linkage 230. As a result, the second over-center linkage 230 may be moved from the locked position to the unlocked position simultaneously with the first over-center linkage 220.

Figure 11:
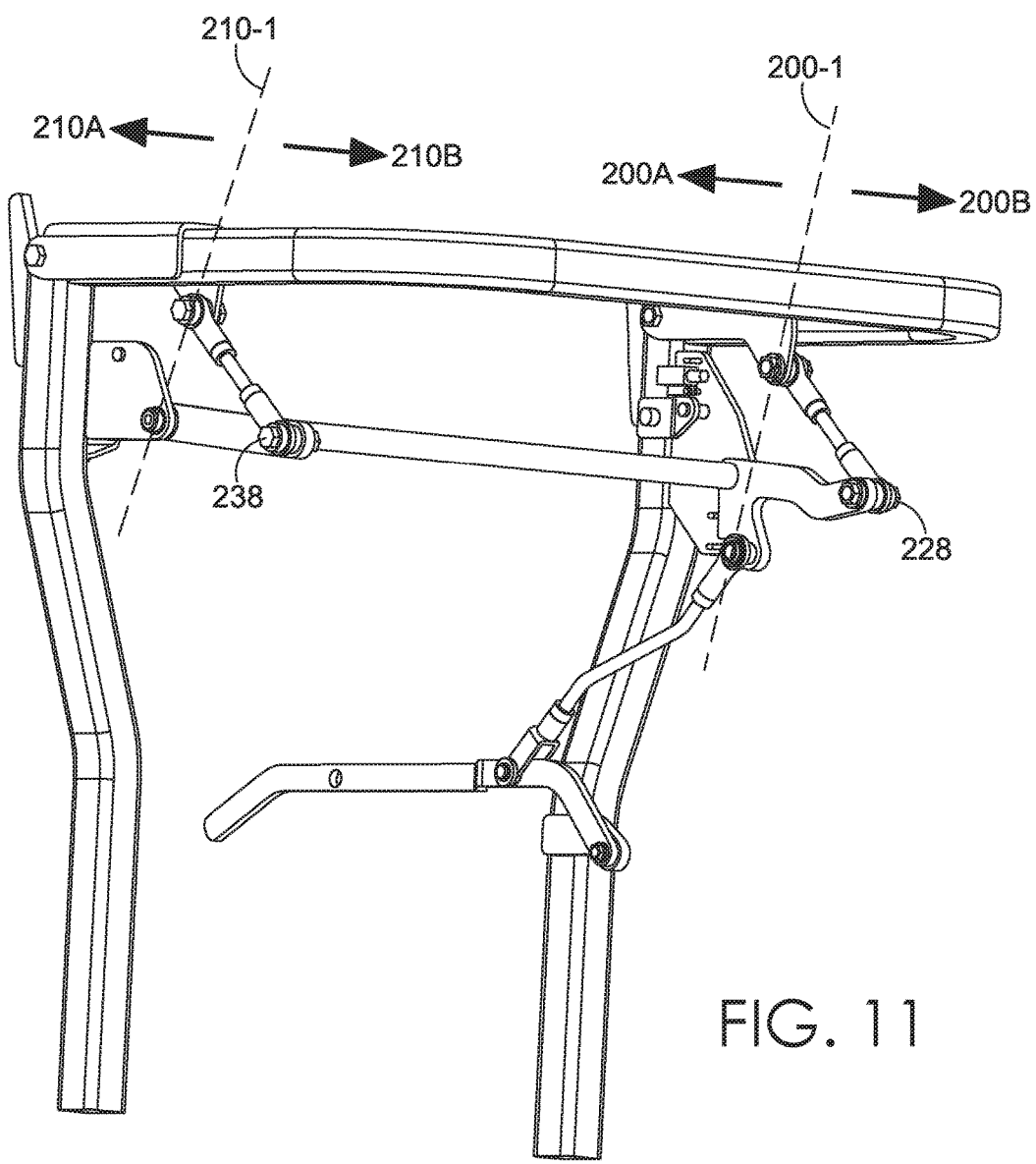
FIG. 11 depicts a perspective of the operator protection apparatus of FIG. 10 in a lowered position, in accordance with aspects hereof.

FIG. 11 depicts the operator protection apparatus 200 and an unlocked/lowered position, in accordance with aspects hereof. The first over-center linkage 220 may be in the unlocked position when the first center pivot joint 228 is on a first centerline second side 200B of the first centerline 200-1. Accordingly, the second over-center linkage 230 is in the unlocked position when the second center pivot joint 238 on a second centerline second side 210B of the second centerline 210-1.

Figure 12:
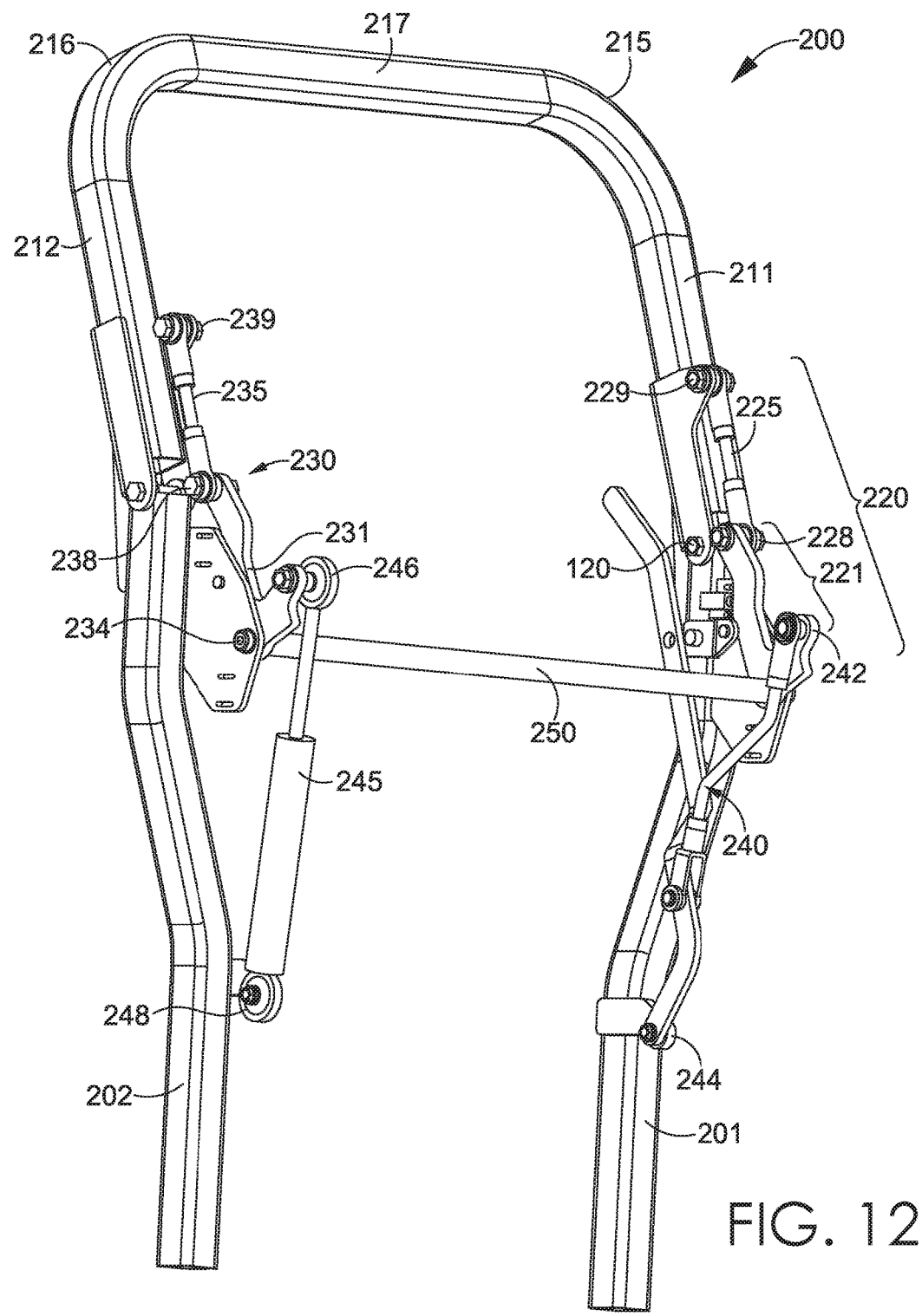
FIG. 12 depicts a perspective view of an operator protection apparatus with an assist in a raised position, in accordance with aspects hereof.

Turning now to FIG. 12, in one aspect, the operator protection apparatus 200 may comprise a gas cylinder 245 coupled to the second over-center linkage 230 at a second actuator-over-center pivot joint 246 and coupled to the second lower portion upright 203 at a second actuator-upright pivot joint 248, in accordance with aspects hereof. The gas cylinder 245 may function as a biasing mechanism or an assist for retaining the second over-center linkage 230 in the locked position. Additionally, the gas cylinder 245 may support and/or compensate for the weight of the upper portion 210 as the upper portion 210 rotates from the raised position to the lowered position. Although shown as a gas cylinder 245 in FIG. 12, other suitable mechanisms (e.g., coil spring, torsion spring, torsion bar) are considered within the scope of this disclosure.

Figure 13:
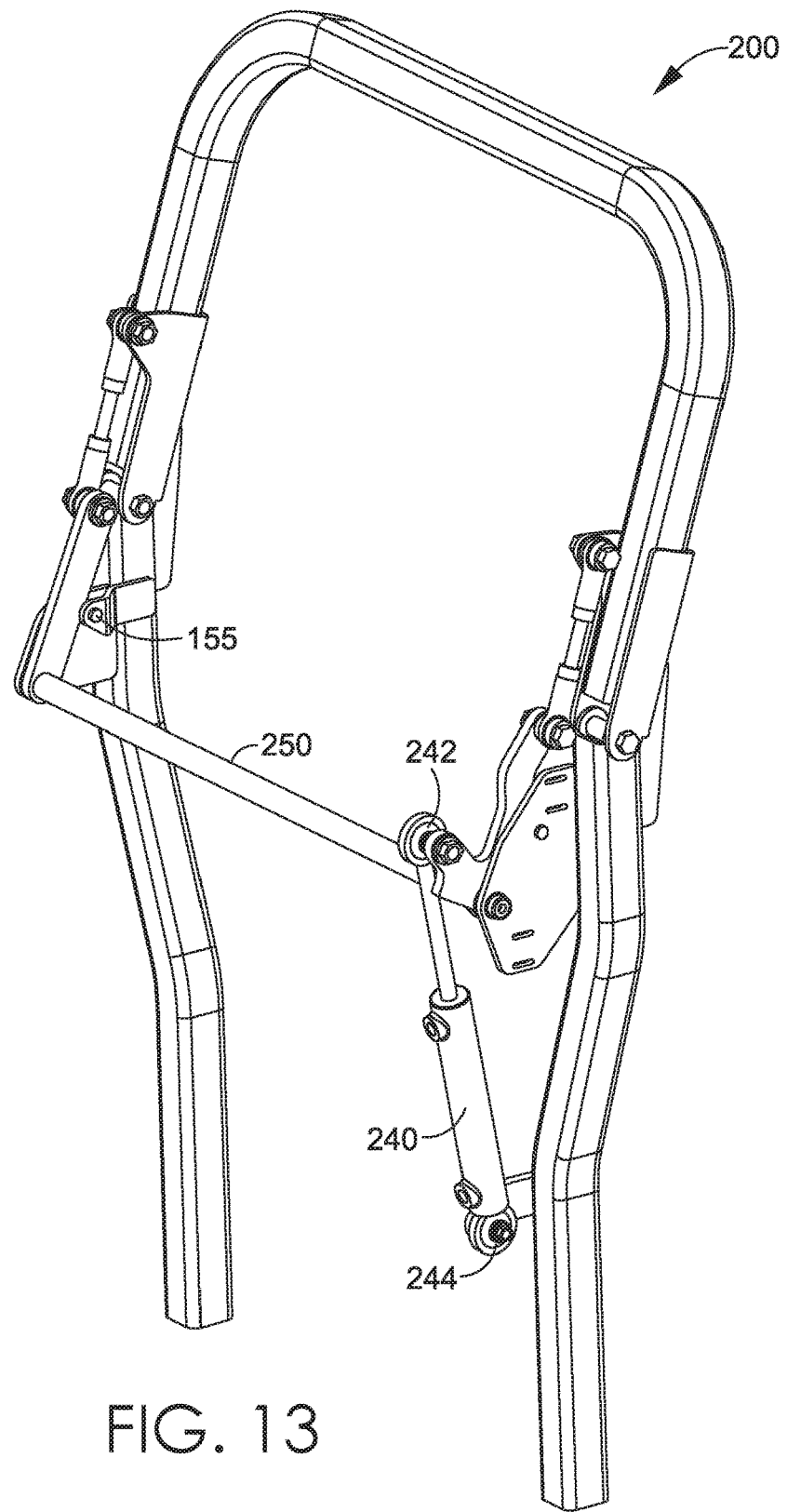
FIG. 13 depicts an alternative perspective view of an operator protection apparatus in a raised position, in accordance with aspects hereof.

Further, as shown in FIG. 13, the operator protection apparatus 200 may implement a powered actuator 240 in place of or in conjunction with any of the actuators contemplated herein. In a nonlimiting example, the powered actuator may be a linear actuator and may be electric, pneumatic, or hydraulic. In some aspects, the powered actuator may be coupled to the first over-center linkage 220 at a first actuator-over-center pivot joint 242 and coupled to the first lower portion upright 202 at a first actuator-upright pivot joint 244. In some aspects, the force provided by the powered actuator may apply a force to secure the operator protection apparatus 200 in the locked position.

Figure 14:
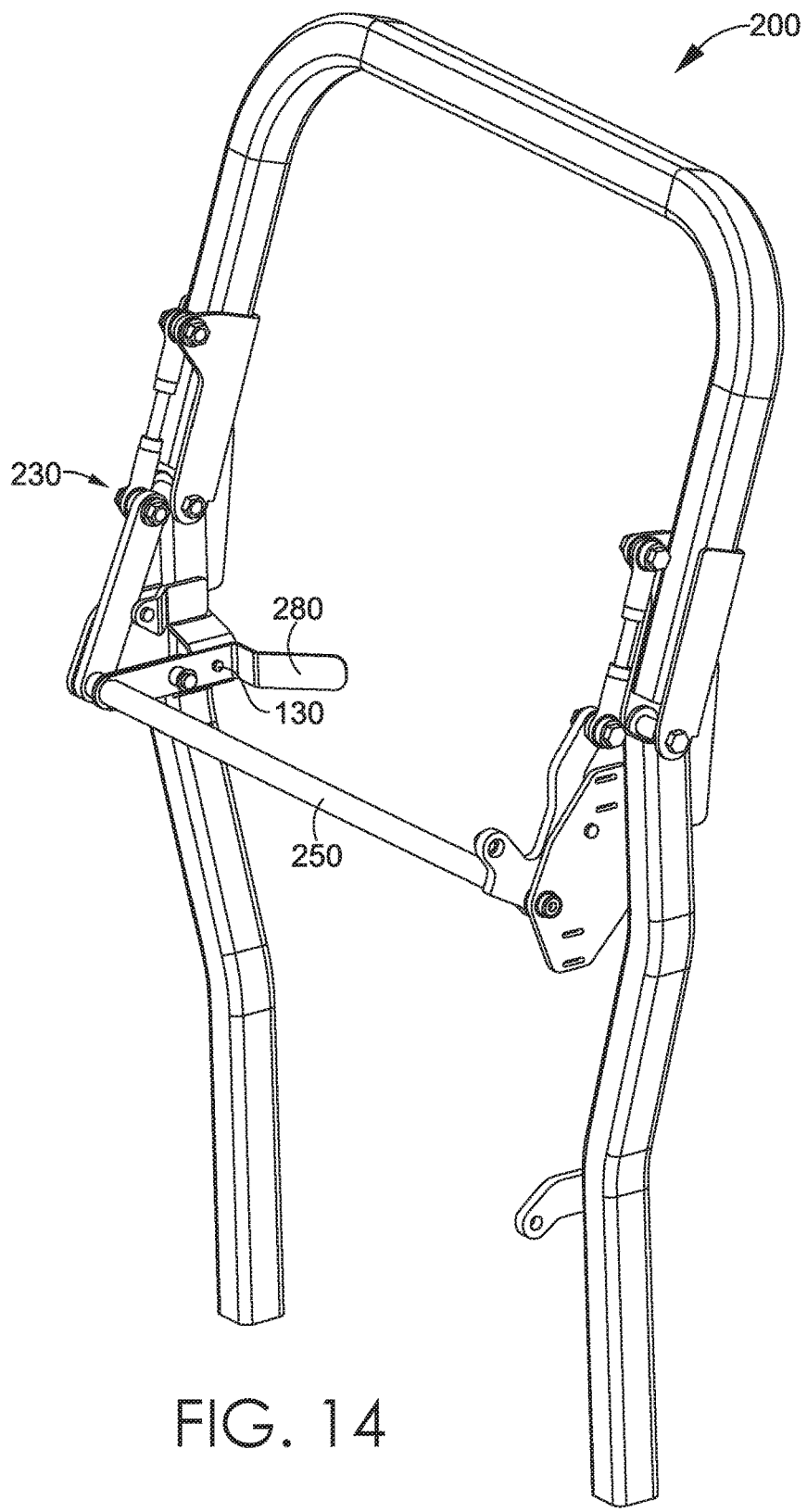
FIG. 14 depicts an alternative perspective view of an operator protection apparatus in a raised position, in accordance with aspects hereof.

Additionally, as shown in FIG. 14, the operator protection apparatus 200 may include a handle 280. The handle 280 may be affixed to the torque tube 250 and positioned such that the handle 280 engages a securing device 130 when the second over-center linkage 230 is in a locked position. Accordingly, the handle 280 may be disengaged from the securing device 130, thereby allowing the over-center linkage to the unlocked and the upper portion to be lowered. As can be appreciated, any of the actuators provided herein may be included on the operator protection apparatus 200 with the handle 280.

Figure 15:
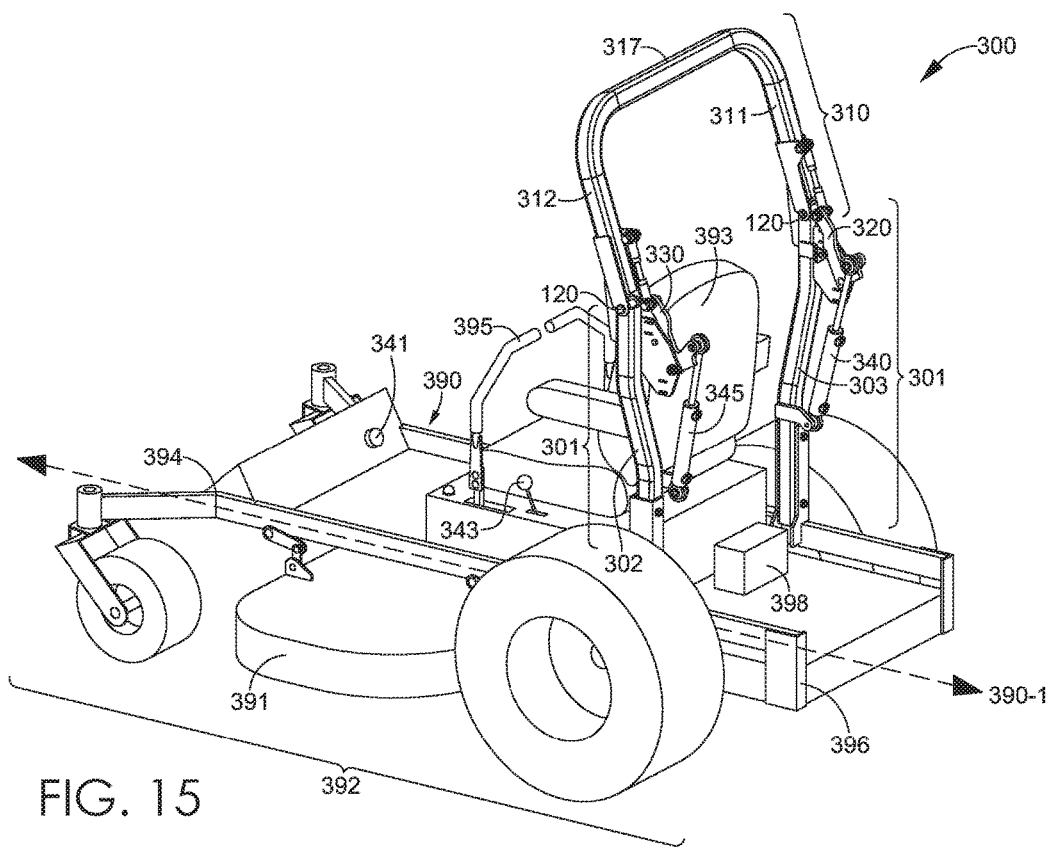
FIG. 15 depicts a riding mower having an operator protection apparatus affixed thereto in a raised position, in accordance with aspects hereof.

With reference now to FIG. 15, in yet another embodiment, an operator protection apparatus 300 having two powered actuators is provided. Accordingly, a first powered actuator 340 and a second powered actuator 345 may be configured to actuate simultaneously and with equal (or different) force. As depicted in FIG. 15, the operator protection apparatus 300 may be affixed to a frame 192 of a vehicle, such as frame 392 of riding mower 390. In some aspects, the riding mower 190 may include a mower deck 391 coupled to the frame 392 and a controller 398. Further, the riding mower 390 may include a seat 393. The frame 392 may include a frame first end 394 and a frame second end 396. In one aspect herein, a horizontal line 390-1 extending from the frame first end 394 to the frame second end 396 defines a horizontal plane, which may be referred to herein in order to describe locations and positions of various components of the operator protection apparatus 300.

The operator protection apparatus 300 may include a lower portion 301 comprising a first lower portion upright 303 and a second lower portion upright 302. Additionally, an upper portion 310 may comprise a transverse member 317 disposed between a first upper portion member 311 and a second upper portion member 312. Further, the operator protection apparatus may have a pair of hinge joints 120 coupling the first lower portion upright 303 to the first upper portion member 311 and the second lower portion upright 302 to the second upper portion member 312, such that the upper portion 310 is movable relative to the lower portion 301.

Additionally, in some aspects, the operator protection apparatus may include a first over-center linkage 320 and a second over-center linkage 330. The first over-center linkage 320 may be coupled to the first lower portion upright 303 and the first upper portion member 311, and the second over-center linkage 330 may be coupled to the second lower portion upright 302 and the second upper portion member 312.

The first powered actuator 340 may be coupled to the first lower portion upright 303 and the first over-center linkage 320. Further, the second powered actuator 345 may be coupled to the second lower portion upright 302 and the second over-center linkage 330. The operator protection apparatus 300 may include at least one input device for controlling the powered actuators 340 and 345. The input device is configured to control actuation of the powered actuators 340 and 345 simultaneously, as mentioned above. In some aspects, the input device may be a simple switch communicatively coupled directly to the powered actuators 340 and 345. In other aspects, the input device may be communicatively coupled to the controller 398, which may control the powered actuators 340 and 345.

In one aspect, the input device may be a foot button 341 that may be depressed by the foot of an operator to initiate actuation for both raising and lowering the upper portion 310. In another aspect, the input device may be a toggle switch 343. For example, holding the toggle switch 343 in a first direction may cause the actuators to lower the upper portion 310 until the switch is released. Additionally, holding the toggle switch 343 in a second direction may cause the actuators 340 and 345 to raise the upper portion 310. Alternatively, momentarily moving the toggle switch 343 in the second direction, rather than holding the toggle switch 343, may cause the actuators 340 and 345 to raise the upper portion to the locked position. Although described in the examples above, the input device may be implemented as any other suitable type of input device and at any other suitable location. For example, the input device may be associated with operator controls 395 such that the operator protection apparatus 300 may be controlled by an operator while the operator is using the operator controls 395.

Figure 16:
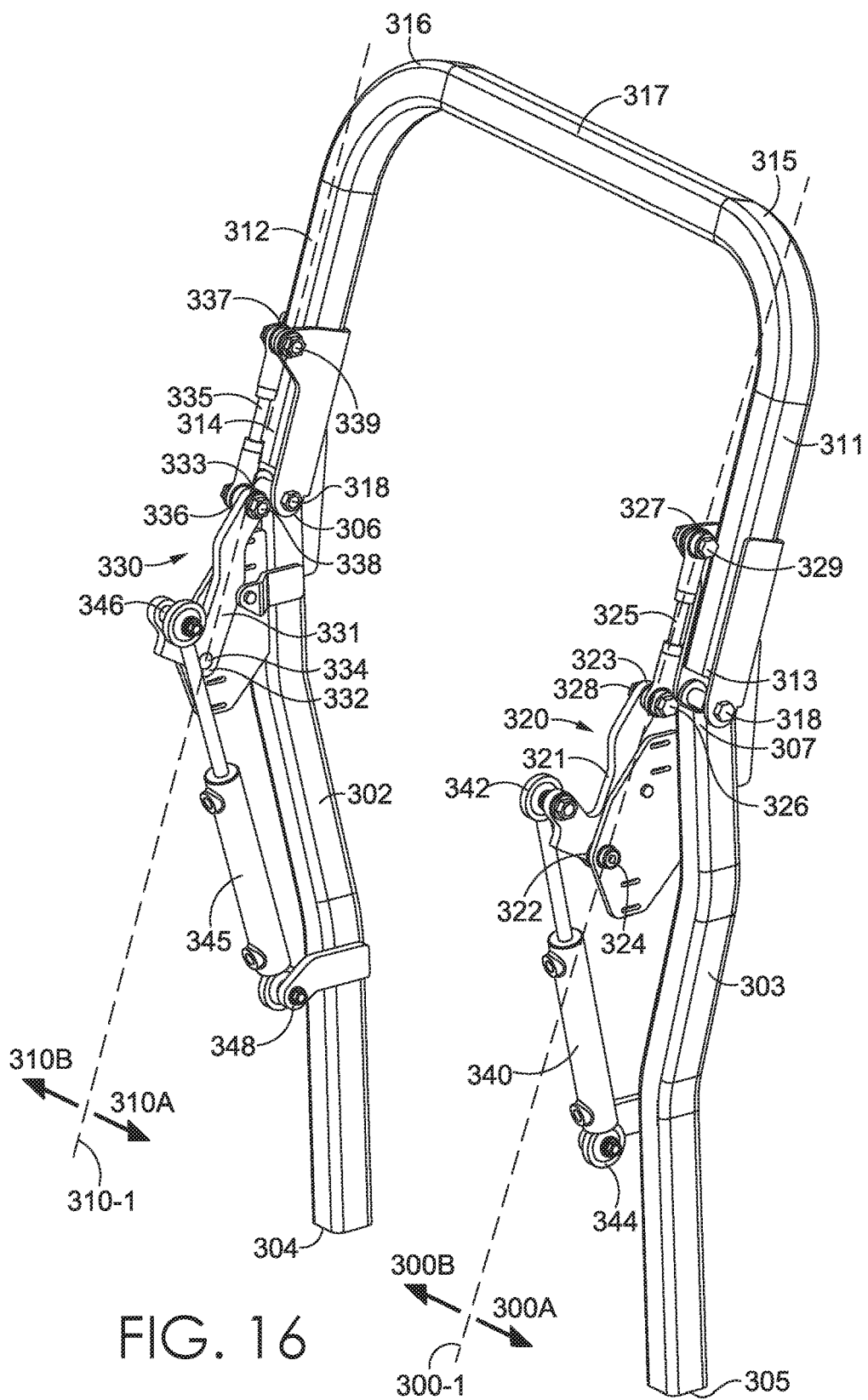
FIG. 16 depicts a perspective view of the operator protection apparatus of FIG. 15 in a raised position, in accordance with aspects hereof.

Turning now to FIG. 16, the first lower portion upright 303 may have a first upright first end 305 and a first upright second end 307. The second lower portion upright 302 may have a second upright first end 304 and a second upright second end 306. In one aspect, the first upright first end 305 and the second upright first end 304 may be affixed to a frame of a terrain-working vehicle (for example riding mower 390). The first upper portion member 311 may have a first member first end 313 and a first member second end 315. The second upper portion member 312 may have a second member first end 314 and a second member second end 316.

The first over-center linkage 320 may comprise a first lower link assembly 321 having a first lower link first end 322 and a first lower link second end 323. The first lower link first end 322 may be pivotably coupled to the first lower portion upright 303 at a first lower link pivot joint 324. The first over-center linkage 320 may also comprise a first upper link assembly 325 having a first upper link first end 326 and a first upper link second end 327. The first upper link assembly 325 first end may be pivotably coupled to the first lower link second end 323 at a first center pivot joint 328. Further, the first upper link second end 327 may be pivotably coupled with the first upper portion member 311 at a first upper pivot joint 329. In one aspect, the first powered actuator 340 is coupled to the first over-center linkage 320 at a first actuator-over-center pivot joint 342 and coupled to the first lower portion upright 303 at a first actuator-upright pivot joint 344.

The operator protection apparatus 300 may comprise a second over-center linkage 330. The second over-center linkage 330 may comprise a second lower link assembly 331 having a second lower link first end 332 and a second lower link second end 333. The second lower link first end 332 may be pivotably coupled to the second lower portion upright 302 at a second lower link pivot joint 334. The second over-center linkage 330 may also comprise a second upper link assembly 335 having a second upper link first end 336 and a second upper link second end 337. The second upper link assembly 335 first end may be pivotably coupled to the second lower link second end 333 at a second center pivot joint 338. Further, the second upper link second end 337 may be pivotably coupled with the second upper portion member 312 at a second upper pivot joint 339. The second powered actuator 345 may be coupled to the second over-center linkage 330 at a second actuator-over-center pivot joint 346 and coupled to the second lower portion upright 302 at a second actuator-upright pivot joint 348.

The first over-center linkage 320 may be in a locked position when the first center pivot joint 328 is on a first centerline first side 300A of a first centerline 300-1 extending between the first lower link pivot joint 324 and the first upper pivot joint 329. The second over-center linkage 330 may be in a locked position when the second center pivot joint 338 is on a second centerline first side 310A of a second centerline 310-1 extending between the second lower link pivot joint 334 and the second upper pivot joint 339.

Figure 17:
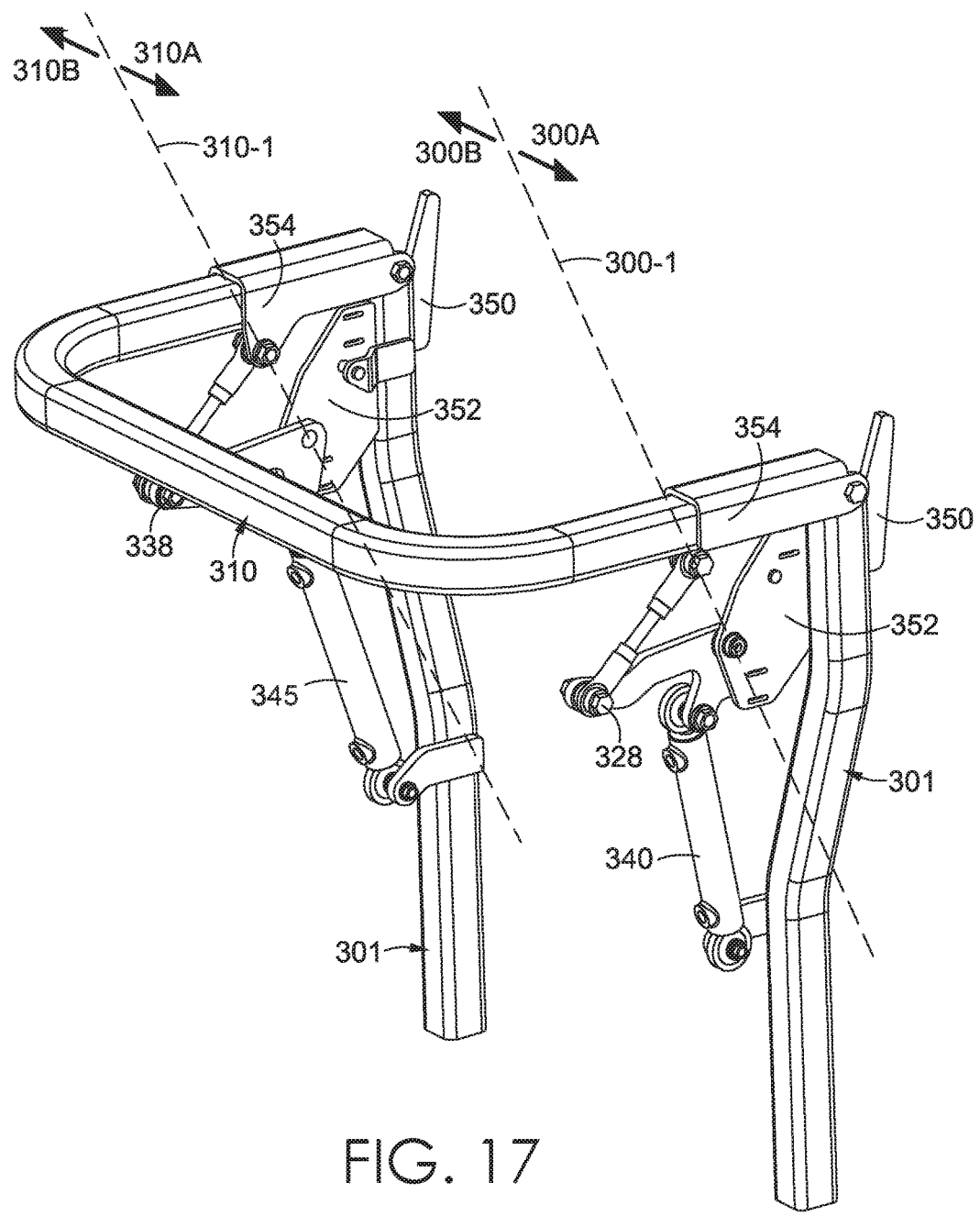
FIG. 17 depicts a perspective view of the operator protection apparatus of FIG. 15 in a lowered position, in accordance with aspects hereof.

Turning now to FIG. 17, the first over-center linkage 320 may be in an unlocked position when the first center pivot joint 328 is on a first centerline second side 300B of the first centerline 300-1. Accordingly, the second over-center linkage 330 is in an unlocked position when the second center pivot joint 338 is on a second centerline second side 310B of the second centerline 310-1. The first powered actuator 340 and the second powered actuator 345 may pull down on the first lower link assembly 321 and the second lower link assembly 331, thereby moving the center pivot joints 328 and 338 to the centerline second sides 300B and 310B. Additionally, similar to the embodiments described hereinabove, the operator protection apparatus 300 may include one or more stops 350 that limit a range of motion of the upper portion 310 relative to the lower portion 301. Further, the operator protection apparatus 300 may include a pair of lower portion brackets 352 and a pair of upper portion brackets 354 for coupling the first over-center linkage 320 and the second over-center linkage 330 to the lower portion 301 and the upper portion 310.

Figure 18:
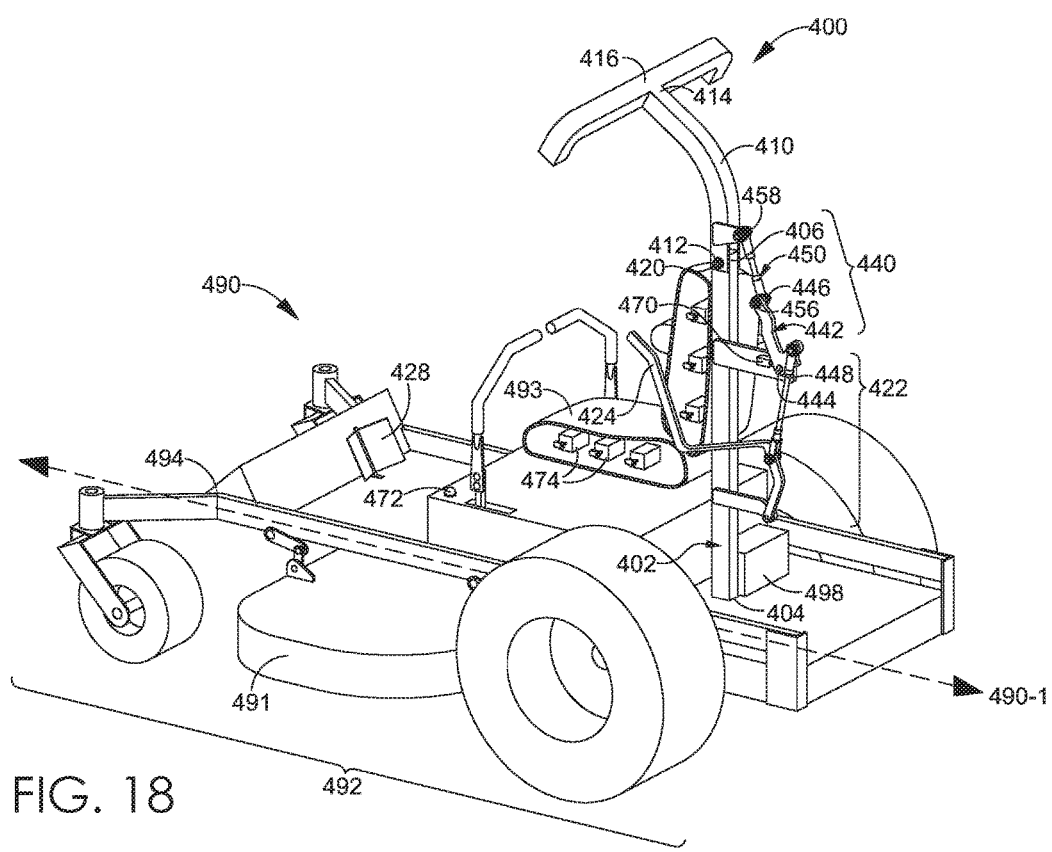
FIG. 18 depicts a riding mower having an alternative operator protection apparatus affixed thereto in a raised position, in accordance with aspects hereof.

In an additional embodiment, as depicted in FIG. 18, an operator protection apparatus 400 may be affixed to a frame of a vehicle, such as frame 492 of riding mower 490. In some aspects, the riding mower may include a mower deck 491 coupled to the frame 492 and a controller 498. Further, the riding mower 490 may include a seat 493. The riding mower may comprise, a frame 492 having a frame first end 494 and a frame second end 496. In one aspect herein, a horizontal line 490-1 extending from the frame first end 494 to the frame second end 496 defines a horizontal plane, which may be referred to herein in order to describe locations and positions of various components of the operator protection apparatus 400.

The operator protection apparatus 400 may include a lower portion 402 comprising a lower portion first end 404 and a lower portion second end 406. Additionally, the operator protection apparatus 400 may include an upper portion 410 comprising a single upper portion member having an upper portion first end 412 and an upper portion second end 414. The upper portion 410 may include a cross member 416 affixed to the upper portion second end 414. Further, the operator protection apparatus 400 may have a hinge joint 420 coupling the lower portion second end 406 to the upper portion first end 412, such that the upper portion 410 is movable relative to the lower portion 402.

Additionally, in some aspects, the operator protection apparatus may include an over-center linkage 440 coupled the lower portion 402 and the upper portion 410. In some aspects, the over-center linkage 440 may include a lower link assembly 442 having a lower link first end 444 and a lower link second end 446 pivotably coupled to the lower portion 402 at a lower pivot joint 448. Further, the over-center linkage 440 may include an upper link assembly 450 pivotably coupled to the lower link assembly 442 at a center pivot joint 456. The lower link first end may be pivotably coupled to the lower portion 402 at the lower pivot joint 448. Additionally, the upper link assembly 450 may be pivotably coupled with the upper portion 410 at an upper pivot joint 458. The lower link assembly first end may be pivotably coupled to the lower portion 402 at the lower pivot joint 448. Further, the over-center linkage 440 may include an upper link assembly 450 having an upper link first end 452 and an upper link second end 454. The upper link first end 452 may be pivotably coupled to the lower link second end 446 to at the center pivot joint 456. Additionally, the upper link assembly second end may be pivotably coupled with the upper portion 410 at an upper pivot joint 458.

Additionally, the operator protection apparatus 400 may include an actuator 422 coupled to the lower portion 402 and the over-center linkage 440. In one aspect, the actuator may comprise a hand lever 424, although any of the actuators contemplated herein may be used. For example, similar to the riding mower depicted in FIG. 1, the riding mower 490 may include a foot pedal 428. The foot pedal 428 may have a first side and a second side that rotate about a pivot such that both sides of the pedal may be pushed by an operator and may be associated with a mechanical actuator, as described hereinabove.

The operator protection apparatus 400 may also include a position sensor 470. Further, the operator protection apparatus 400 may be coupled to one or more indicators. The one or more indicators may provide a warning or a notification that a position of the operator protection apparatus 400 should be changed, or is in an unlocked position. For example, a visual indicator 472, which may be a light, may provide a visual indication that the operator protection apparatus 400 should be in the locked position. Additionally, one or more tactile indicators 474 may be employed to notify or warn the operator of a condition related to the operator protection apparatus 400. Further, the one or more indicators may include an audio indicator (although not shown here, the audio indicator may be associated with the controller 498).

Turning now to a general discussion of each of the embodiments described hereinabove, a variety of additional features may be implemented with each of the embodiments. Additionally, some of the features described hereinabove may include variations, which may be applicable to each of the embodiments described herein. For example, although the over-center linkages described hereinabove and depicted in the figures may provide an advantageous configuration, other configurations should be considered within the scope of this disclosure. For example, it is contemplated that an over-center linkage could be positioned such that it is affixed to either an interior surface or an exterior surface of an operator protection apparatus.

Additionally, the hinge joints described hereinabove may alternatively be described as including the over-center linkages. Said another way, a hinge joint that includes an over-center linkage for locking an operator protection system has been contemplated and should be considered within the scope of this disclosure. Additionally, it should be appreciated that the features of the various embodiments described herein may be incorporated with one another.

In another aspect, an operator protection apparatus may be provided without an actuator. In one aspect, a grip or other member may extend from the center pivot joint of at least one over-center linkage. Accordingly, the over-center linkage may be unlocked without employing an actuator. In another aspect, a rod may extend between center pivot joints of two over-center linkages. The rod may be manually moved between the locked and unlocked position.

Further, the one or more sensors described hereinabove may include any number of sensors associated with a vehicle and/or the operator protection apparatus. In some aspects, the operator protection apparatus may include logic that is integrated with the apparatus or is configured for integration with a controller, or other computing device associated with the vehicle. Accordingly, an operator protection apparatus may receive sensor data from a variety of sensors. For example, a vehicle may include a tilt sensor configured to detect a tilt of the vehicle, for example in a controller (e.g. controller 198, 298, 398, or 498). In another aspect, the tilt sensor may be provided and included with the operator protection apparatus. Additionally, the operator protection apparatus may be configured to receive sensor data from a seatbelt sensor associated with the vehicle including, for example, whether the seatbelt is buckled or unbuckled.

The sensed data obtained from different sensors may be used by the operator protection apparatus logic to make a number of determinations. For example, the sensor data may be used to determine that the operator protection apparatus is in a lowered position, and the seatbelt is engaged. In this scenario, the operator protection apparatus may cause the controller to disengage the mower blades. In another aspect, the sensed data may be used to determine that the operator protection apparatus is in a raised position and the seatbelt is disengaged. In this example, similar to the previous scenario, the operator protection apparatus may communicate a command to the controller to disengage the blades. In additional aspects, the operator protection apparatus may activate one or more indicators (e.g., a visual indicator 472 and a tactile indicator 474) or warning signals, based on the sensor data. For example, the sensor data may be used to activate audio, visual, or tactile indicators for alerting an operator of the vehicle that a state of the vehicle or the operator protection apparatus should be changed.

Deployable Operator Protection Apparatus with an Over-Center Linkage

In accordance with other aspects of this invention, a deployable operator protection apparatus is described herein. In other words, the operator protection apparatus may be biased to return to a raised and locked position, for example, when an input device (such as a lever or switch) is released by an operator, or after a predetermined amount of time. Additionally, the operator protection apparatus may be secured in the locked position by one or more over-center linkages. Accordingly, an over-center linkage may be employed as a securing mechanism that automatically engages to secure the operator protection apparatus when the operator protection apparatus is moved to the raised position. As can be appreciated, the over-center linkage may provide a simplified means of securing the operator protection apparatus, as an operator may not need to cease operation to apply a separate securing mechanism, such as a retaining pin.

Figure 19:
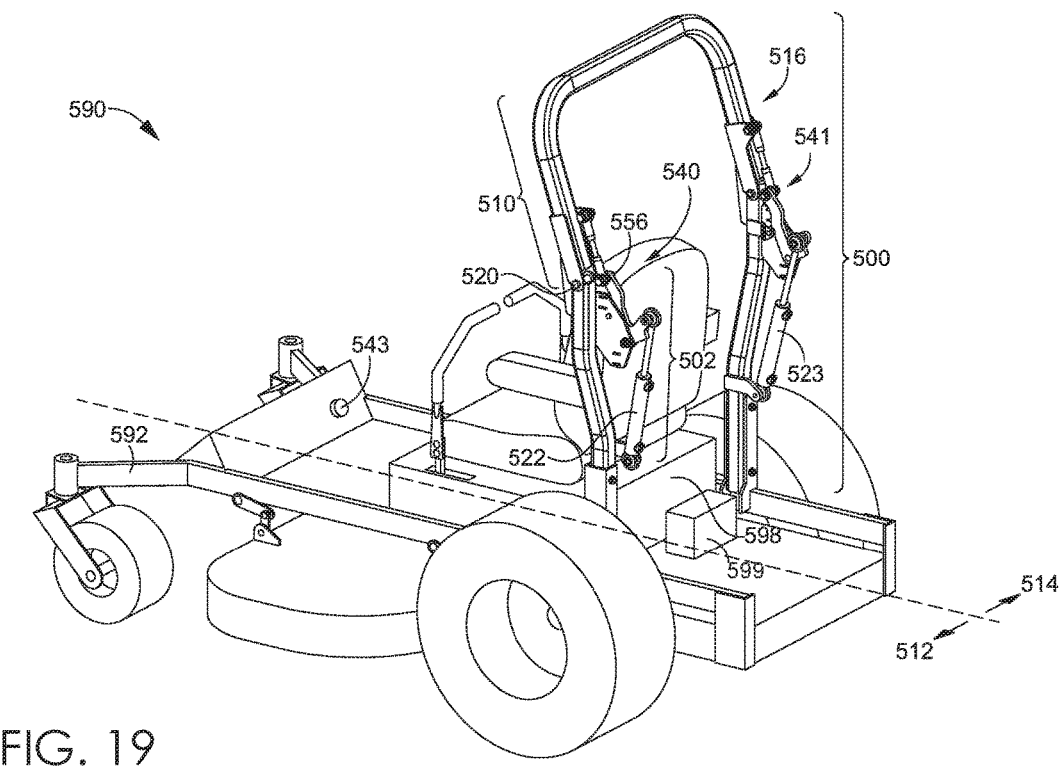
FIG. 19 depicts a perspective view of the vehicle having an improved operator protection apparatus having a switch positioned to be operable by an operator's foot, in accordance with aspects hereof.
Figure 20:
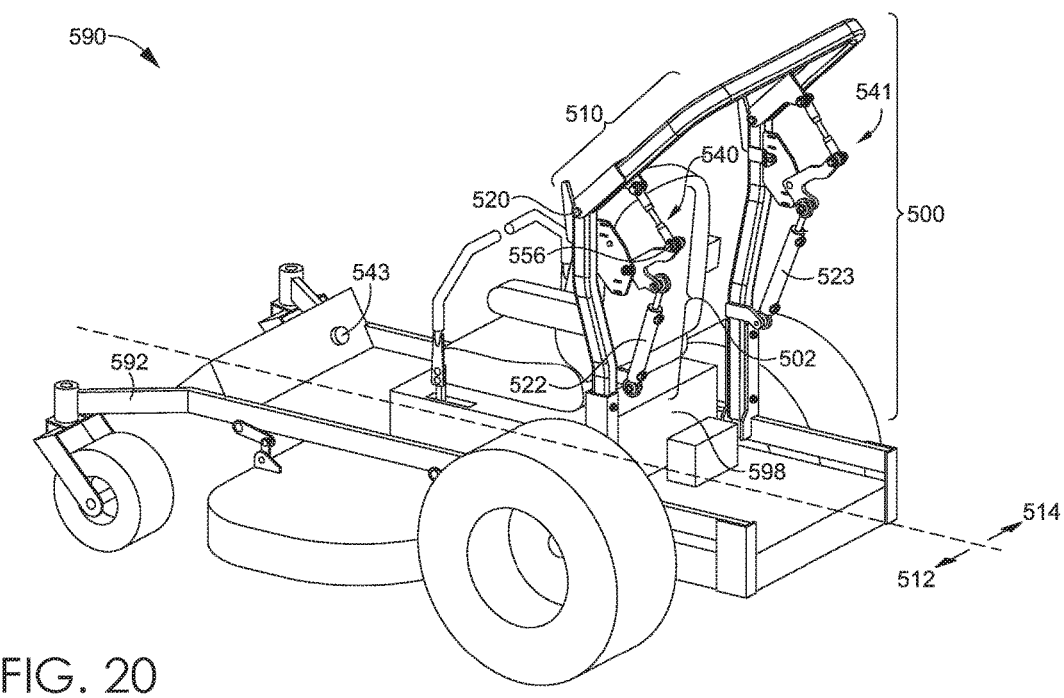
FIG. 20 depicts a perspective view of the vehicle having the improved operator protection apparatus between the raised and lowered position, in accordance with aspects hereof.
Figure 21:
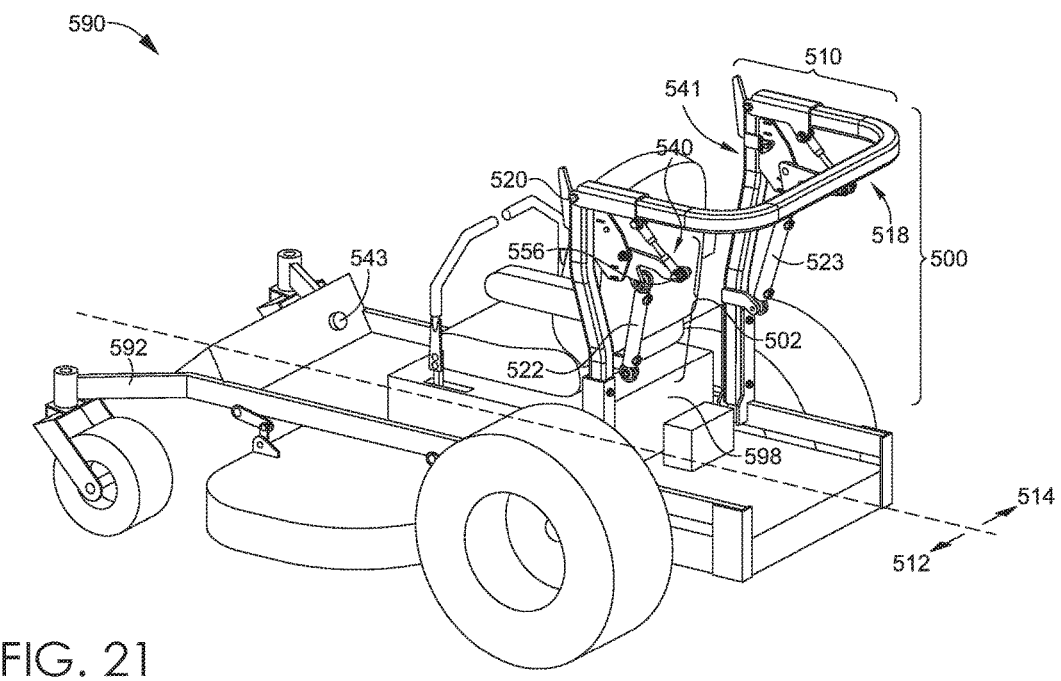
FIG. 21 depicts a perspective view of the vehicle having the improved operator protection apparatus in the lowered position, in accordance with aspects hereof.

Turning now to FIG. 19, a vehicle 590 is depicted as comprising a frame 592, an operator platform 598, and an operator protection apparatus 500. In accordance with aspects herein, the operator protection apparatus 500 comprises a lower portion 502 and an upper portion 510, both of which are coupled to an over-center linkage 540. The upper portion 510 may be movably coupled to the lower portion 502 about a hinge joint 520, such that the upper portion may be moved between a raised and locked position, as shown in FIG. 19, an intermediate position, as shown in FIG. 20, and a lowered position, as shown in FIG. 21. The locked and unlocked positions of the over-center linkage 540 are the same as the over-center linkages 140, 220, 230, 320, 330 or 440 discussed with reference to FIGS. 1-18 of this disclosure, and as such, will not be repeated here.

With continued reference to FIG. 19, an actuator 522 is depicted as being coupled with the over-center linkage 540. The actuator 522 may be coupled to the over-center linkage 540, such that the actuator 522 unlocks the over-center linkage 540 and rotates the upper portion 510 with respect to the lower portion 502. Further, the actuator 522 may be communicatively coupled with a switch 543. In one aspect, the switch 543 may be a normally-open switch. When the switch 543 is in a closed state, for example when an operator applies force to the switch 543, the actuator 522 is effective to unlock the over-center linkage 540 and to move the operator protection apparatus 500 toward the lowered position.

Accordingly, when the switch 543 is in the open state (which may be a default state of the switch), such as when an operator is not applying force to the switch 543, the actuator 522 is effective to move the operator protection apparatus 500 toward the raised position and the over-center linkage 540 to the locked position. As can be appreciated, the actuator 522 may serve to retain the operator protection apparatus 500 in the raised position in conjunction with the over-center linkage 540, and to retain the operator protection apparatus 500 in the lowered position.

In accordance with aspects herein, an "outside mechanical force" may be used to maintain switch 543 in the closed state. For example, in order to maintain the switch 543 in the closed state, an operator must continually apply an "outside mechanical force" to the switch, which may be done by an operator's hand, foot, or other body part. Conversely, a force that maintains the switch in the open state from within (e.g., through use of a spring) may be referred to as an "internal mechanical force."

In one aspect, the operator protection apparatus 500 may automatically return to the raised and locked position after a predetermined amount of time. For example, once the switch 543 has been activated to unlock the over-center linkage 540 and lower the upper portion 510, the upper portion 510 may be automatically returned to the raised and locked position after an appropriate amount of time has elapsed (e.g., 30 seconds, 1 minute, etc.). Further, in some aspects the operator protection apparatus 500 may automatically return to the raised and locked position, irrespective of whether the switch 543 is open or closed, when the predetermined amount of time has elapsed. For example, if the operator protection apparatus 500 has been in an unlocked and/or lowered position for a duration that exceeds the predetermined amount of time (e.g., 1 minute, 2 minutes, etc.), the upper portion 510 may be moved to the raised and locked position by the actuator 522. In one example, the duration that the operator protection apparatus 500 has been in the unlocked/lowered positions and the predetermined amount of time may be determined and/or stored by a controller 599, similar to those described in more detail hereinabove (e.g., elements 198, 398, and 498, described with reference to FIGS. 1, 15, 18).

Returning now to discussion of the actuator 522, the actuator may a "powered actuator" or a "manual actuator." As used in this disclosure, the term "powered actuator" refers to actuators which provide electrical, pneumatic, hydraulic, or mechanical forces, among other. In some aspects, the powered actuator may be a linear actuator, a non-linear actuator, or a rotary actuator. Further, as used herein, a "manual actuator" is an actuator driven by a force provided by the operator. For example, a hand lever or a foot pedal, as discussed in further detail below, may be exemplary manual actuators. As can be appreciated, the actuators described above are exemplary, and any other suitable actuator is considered to be within the scope of this disclosure. Therefore, the actuator 522 may be effective to: (1) to lock and unlock the over-center linkage 540, and (2) to raise and lower the operator protection apparatus 500 from the raised position to the lowered position.

In accordance with aspects herein, the vehicle 590 may comprise a second over-center linkage 541 in addition to the over-center linkage 540. As such, the vehicle 590 may comprise a single over-center linkage, or the vehicle 590 may comprise multiple over-center linkages. Accordingly, the vehicle 500 may also include a second actuator 523, coupled to the operator protection apparatus, for example the second over-center linkage. It should be appreciated that a single actuator at the first side 512 of the operator protection apparatus may be employed to move the operator protection apparatus between a raised and lowered position. For example, as discussed hereinabove and shown in FIGS. 10-13, a torque tube, or other suitable means, may be used to transfer the force generated by a single actuator to a second side of the operator protection apparatus.

Turning now to FIG. 20, the terrain-working vehicle 590 is depicted as having the operator protection apparatus 500 at an intermediate position between the raised position and the lowered position. Accordingly, when in the intermediate position, the over-center linkage has been unlocked, and the upper portion 510 has been moved toward the lowered position. For example, in order to move the operator protection apparatus 500 from the locked and raised position toward the lowered position, an outside mechanical force may be continuously applied to the switch 543 by an operator.

As shown in FIG. 21, the vehicle 590 is depicted as having the operator protection apparatus 500 in the lowered position. In accordance with aspects herein, the lowered position generally refers to the position in which the upper portion 510 has rotated about the hinge joint 520 connecting the upper portion 510 to the lower portion 502 throughout a full range of motion. Accordingly, the movement of the upper portion 510 to the lowered position allows the operator protection apparatus 500 to pass underneath low-hanging objects (such as trees with low-hanging branches).

Figure 22:
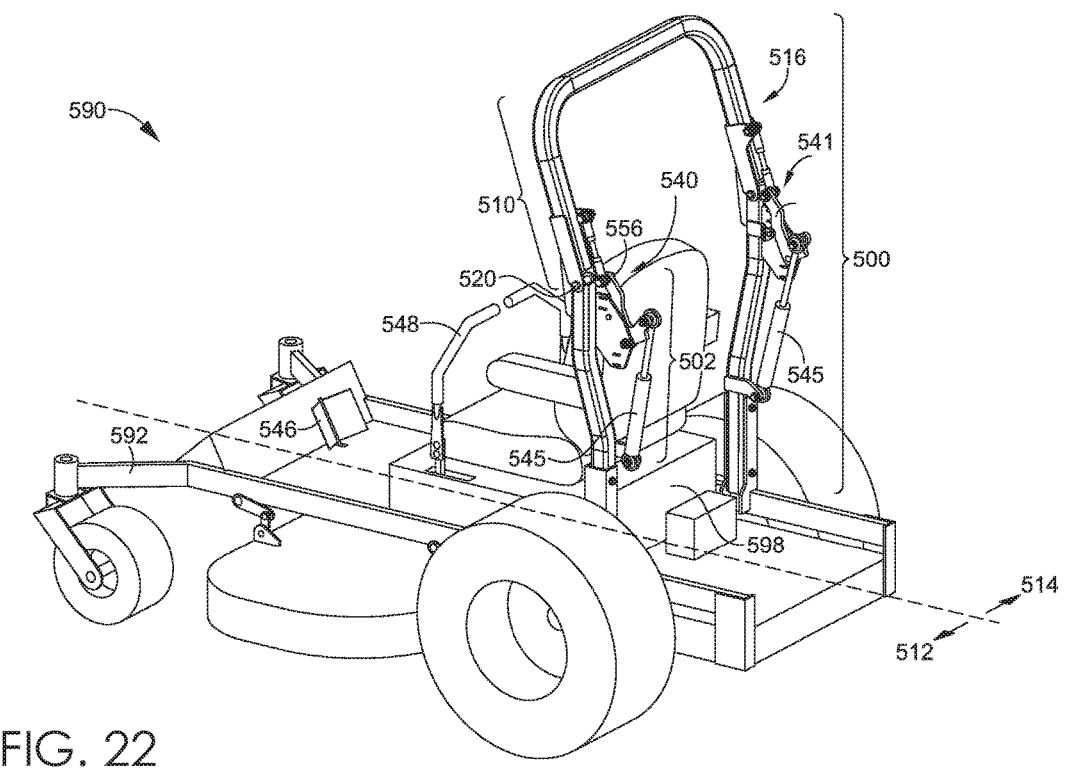
FIG. 22 depicts a perspective view of the vehicle having the improved operator protection apparatus in the raised position, and having a foot pedal, in accordance with aspects hereof.

Turning now to FIG. 22, additional aspects of the vehicle 590 will be discussed. As mentioned above, the actuator may comprise a manual actuator, for example a foot pedal 546, or a hand lever (for example as depicted in FIGS. 1-12). Similar to the switch 543 as described hereinabove, the foot pedal 546 and hand lever may be effective to unlock the over-center linkage in moving the operator protection apparatus toward the lowered position when the force is continuously applied thereto. However, the force may be provided by the operator and imparted to the over-center linkage 540 and/or the operator protection apparatus 500 via, for example, a mechanical linkage or cable. Further, the operator protection apparatus may be mechanically biased by gas cylinders 545 (or other suitable mechanism) to return to the raised position.

It should be appreciated that the various switches and manual actuators described herein may be located at any number of suitable positions. For example, as shown in FIGS. 19-21, the switch may be positioned for operation by the foot of an operator. However, the switch may also be positioned for operation by a hand, wrist, forearm or elbow of an operator. For example, the switch may be positioned proximate or integrated with the operator controls 548. Accordingly, the switch (or switches, for example one switch being located on each handle of the operator controls 548) may be operated by the hands of the operator. In another aspect, the switch may be a toggle switch positions on the operator platform at a location that is accessible to the operator.

Figure 23:
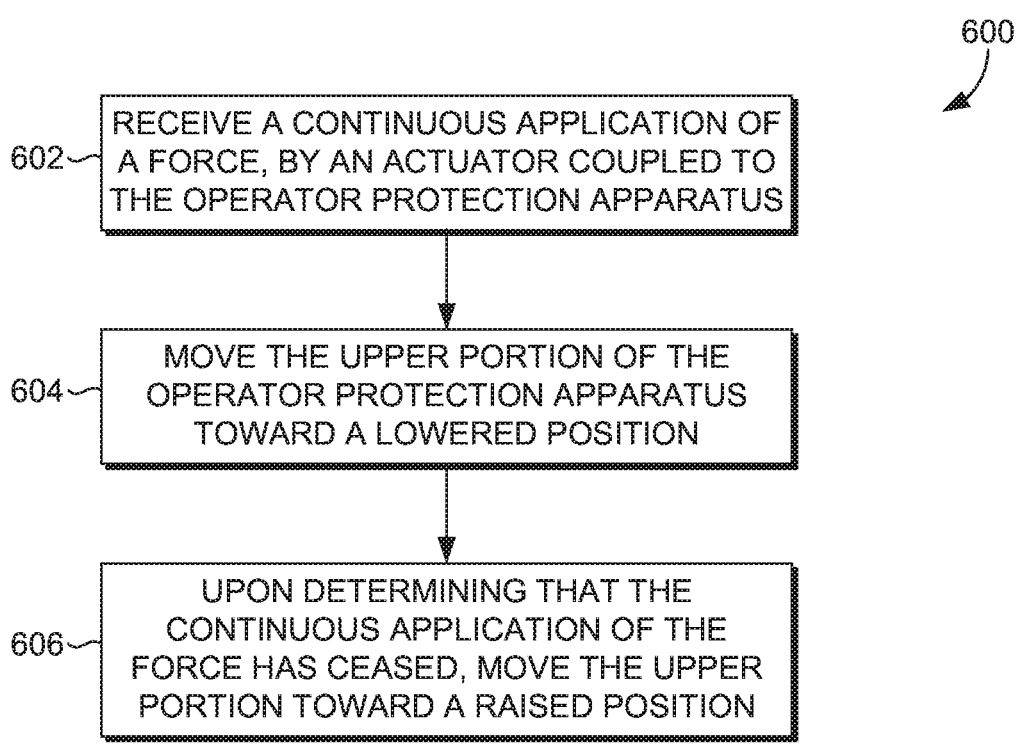
FIG. 23 depicts a block diagram of an exemplary method of operating a foldable operator protection apparatus, in accordance with aspects herein.

Turning now to FIG. 23, a method 600 of operating a foldable operator protection apparatus is provided. As shown at block 602, the method comprises receiving a continuous application of a force, by an actuator, coupled to the operator protection apparatus. As described hereinabove, the actuator may receive the continuous application of the force via communicative coupling with a switch, or directly from a manual actuator. The operator protection apparatus may include a lower portion, an upper portion, and an over-center linkage, as described hereinabove. The method may also include moving the upper portion of the operator protection apparatus toward a lowered position (block 604). The upper portion may be moved by the actuator. In accordance with aspects herein, the actuator may also move the over-center linkage from a locked position toward an unlocked position when the continuous application of the force is received. As shown at block 606, the method may further include: upon determining that the continuous application of the force has ceased, moving the upper portion toward a raised position. In additional aspects, the actuator moves the operator protection apparatus toward the raised position until the over-center linkage is in a locked position, the locked position securing the upper portion in the raised position. As discussed previously, the locked and unlocked positions discussed in method 600 are similar to the locked and unlocked positions shown in FIGS. 2-17, and discussed in the descriptions corresponding to FIGS. 2-17.

As discussed herein, the method 600 of operating a foldable operator protection apparatus may be implemented on a terrain-working vehicle, for example a riding lawnmower. Additionally, the method 600 of operating a foldable operator protection apparatus may further comprise detecting one or more positions of the operator protection apparatus, including the locked and/or raised positions and the unlocked and/or lowered positions. Further, as discussed hereinabove, a variety of sensors may be used to detect information relating to the state of the vehicle and/or the operator protection apparatus. For example, a seatbelt sensor may detect whether the seatbelt is engaged or disengaged.

Accordingly, the method 600 may further comprise, based on the detected (or sensed) information, disengaging the mowing deck, and then re-engaging the mowing deck. As discussed previously, operators of terrain-working vehicles may lower an operator protection apparatus to clear low-hanging obstacles. In order to incentivize the operator to return the operator protection apparatus to the raised position, the mowing deck may be disengaged if the operator protection apparatus is detected in the lowered position. Therefore, in order to resume the normal operation of the terrain-working vehicle, the operator protection apparatus must subsequently be detected in the raised position, which will in turn re-engage the mowing deck.

Additionally, although some embodiments herein have been described as performing actions (e.g., unlocking/lowering and raising/locking) in response to a condition (e.g., application or cessation of a force), it should be appreciated that such actions are not necessarily executed at the precise time that the condition is satisfied. For example, in some embodiments, an action performed upon application or cessation of a force may be delayed, either intentionally, or as an inherent characteristic of an actuator or a switch associated with the operator protection apparatus. Accordingly, use of temporal terminology such as "upon," "when," and the like, to describe a condition should not be construed as limiting a resulting function to the exact moment that the condition is satisfied.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and subcombinations are of utility and may be employed without reference to other features and subcombinations and are contemplated within the scope of the claims. Not all steps listed in the various figures need be carried out in the specific order described.

What is claimed:

1. An operator protection apparatus for a terrain-working vehicle, the operator protection apparatus comprising:
   a lower portion and an upper portion movably coupled to the lower portion such that the upper portion is movable relative to the lower portion between a raised position and a lowered position; and
   an over-center linkage movable between a locked position and an unlocked position, the locked position securing the upper portion in the raised position, wherein:

upon an application of a force to an input device controllingly coupled with the operator protection apparatus, the over-center linkage moves to the unlocked position; and upon a cessation of the force, the over-center linkage moves to the locked position.

2. The operator protection apparatus of claim 1, further comprising an actuator coupled to the over-center linkage.

3. The operator protection apparatus of claim 2, wherein the actuator moves the over-center linkage between the locked position and the unlocked position.

4. The operator protection apparatus of claim 2, wherein upon the application of the force, the actuator moves the upper portion toward the lowered position.

5. The operator protection apparatus of claim 2, wherein upon the cessation of the force, the actuator moves the upper portion toward the raised position.

6. The operator protection apparatus of claim 2, wherein the input device is a switch having a normally-open default state that is communicatively coupled to the actuator, wherein:
when the switch is in a closed state, the actuator is effective to apply the force and unlock the over-center linkage; and
when the switch is in an open state, the actuator is effective to move the over-center linkage toward the locked position.

7. The operator protection apparatus of claim 6, wherein the actuator comprises a powered actuator and the switch comprises a button.

8. The operator protection apparatus of claim 6, wherein an outside mechanical force maintains the switch in the closed state.

9. The operator protection apparatus of claim 6, wherein the actuator retains the upper portion in the lowered position when the switch is in the closed state and the upper portion reaches the lowered position.

10. The operator protection apparatus of claim 6, wherein the actuator retains the upper portion in the raised position when the switch is in the open state and the upper portion reaches the raised position.

11. The operator protection apparatus of claim 1, wherein the input device is one of a foot pedal and a hand lever.

12. The operator protection apparatus of claim 1, wherein the over-center linkage has a center pivot joint, wherein the over-center linkage is in the locked position when the center pivot joint is on a first side of a centerline of the over-center linkage, and the over-center linkage is in the unlocked position when the center pivot joint is on a second side of the centerline.

13. A terrain-working vehicle with an operator protection apparatus, the terrain-working vehicle comprising:
a frame; and
an operator protection apparatus coupled to the frame, the operator protection apparatus comprising:
a lower portion and an upper portion, the upper portion movably coupled directly to the lower portion such that the upper portion is movable relative to the lower portion between a raised position and a lowered position;
an over-center linkage coupled to the lower portion and the upper portion; and
an actuator coupled to the over-center linkage, operable to move the over-center linkage between a locked position and an unlocked position,
wherein the over-center linkage is biased toward the locked position, the locked position securing the upper portion in the raised position.

14. The terrain-working vehicle of claim 13, wherein moving the over-center linkage toward the unlocked position moves the upper portion toward the lowered position.

15. The terrain-working vehicle of claim 13, wherein the actuator is operable to move the over-center linkage from the unlocked position to the locked position when the over-center linkage is in the unlocked position for a predetermined duration.

16. A method of operating a foldable operator protection apparatus, the method comprising:
receiving a continuous application of a force, by an actuator coupled to an operator protection apparatus, the operator protection apparatus having a lower portion, an upper portion, and an over-center linkage;
moving the upper portion of the operator protection apparatus toward a lowered position; and
upon determining that the continuous application of the force has ceased, moving the upper portion toward a raised position.

17. The method of claim 16, wherein the actuator moves the over-center linkage from a locked position toward an unlocked position when the continuous application of the force is received.

18. The method of claim 16, wherein upon determining that the continuous application of the force has ceased, the actuator moves the operator protection apparatus toward the raised position until the over-center linkage is in a locked position, the locked position securing the upper portion in the raised position.

19. The method of claim 16, wherein the operator protection apparatus is affixed to a terrain-working vehicle having a mowing deck.

20. The method of claim 16, further comprising detecting one or more positions of the operator protection apparatus, the one or more positions including a locked position and an unlocked position.

* * * * *